US012761317B2

(12) United States Patent
Matsuura

(10) Patent No.: US 12,761,317 B2
(45) Date of Patent: Oct. 13, 2026

(54) INFORMATION PROCESSING SYSTEM, INFORMATION PROCESSING DEVICE, AND INFORMATION PROCESSING METHOD

(71) Applicant: Nekka Matsuura, Kanagawa (JP)

(72) Inventor: Nekka Matsuura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 334 days.

(21) Appl. No.: 18/184,856

(22) Filed: Mar. 16, 2023

(65) Prior Publication Data

US 2023/0305108 A1 Sep. 28, 2023

(30) Foreign Application Priority Data

Mar. 23, 2022 (JP) ................................ 2022-046513
Feb. 13, 2023 (JP) ................................ 2023-020044

(51) Int. Cl.
*G01S 7/41* (2006.01)
*G01S 7/00* (2006.01)
(Continued)

(52) U.S. Cl.
CPC .............. *G01S 7/412* (2013.01); *G01S 7/006* (2013.01); *G01S 13/003* (2013.01); *G06N 20/00* (2019.01)

(58) Field of Classification Search
CPC ........ G01S 7/412; G01S 7/006; G01S 13/003; G06N 20/00
(Continued)

(56) References Cited

U.S. PATENT DOCUMENTS 6,704,455 B1 3/2004 Yamazaki et al.
2001/0043752 A1 11/2001 Matsuura et al.
(Continued)

FOREIGN PATENT DOCUMENTS

JP 2010-179626 8/2010
JP 2016-092638 5/2016
JP 2022-017564 1/2022

OTHER PUBLICATIONS

Santhalingam et al. "mmASL: Environment-Independent ASL Gesture Recognition Using 60 GHz Millimeter-wave Signals," Proc. ACM Interact. Mob. Wearable Ubiquitous Technol., vol. 4, No. 1, Article 26. Publication date: Mar. 2020 (Year: 2020).*
(Continued)

*Primary Examiner* — Resha Desai
*Assistant Examiner* — Samarina Makhdoom
(74) *Attorney, Agent, or Firm* — IPUSA, PLLC

(57) ABSTRACT

Disclosed is an information processing system configured to use radio waves to sense an action of a user who operates a device. The information processing system includes one or more processors; and a memory storing a computer-readable program having instructions, which when executed by the one or more processors, cause the one or more processors to execute a process, the process including acquiring a state of radio waves in an area where a device is installed; receiving information from the device, the information indicating that a predetermined event has been detected; and notifying that the predetermined event has occurred at the device, based on a state of radio waves acquired during a predetermined period before the predetermined event and the acquired state of radio waves.

20 Claims, 22 Drawing Sheets

(51) Int. Cl.
*G01S 13/00* (2006.01)
*G06N 20/00* (2019.01)

(58) Field of Classification Search
USPC .............................................................. 342/52
See application file for complete search history.

(56) References Cited

U.S. PATENT DOCUMENTS

| | | | | |
|---|---|---|---|---|
| 2002/0191855 | A1 | 12/2002 | Matsuura et al. | |
| 2003/0012445 | A1 | 1/2003 | Matsuura et al. | |
| 2003/0198397 | A1 | 10/2003 | Matsuura et al. | |
| 2004/0114819 | A1 | 6/2004 | Matsuura et al. | |
| 2007/0220365 | A1* | 9/2007 | Castellani | G06Q 10/00 714/46 |
| 2015/0091780 | A1* | 4/2015 | Lyren | G02B 27/017 345/8 |
| 2015/0266314 | A1* | 9/2015 | Toia | B41J 11/006 347/104 |
| 2018/0224980 | A1* | 8/2018 | Avila | G06V 40/28 |
| 2018/0330254 | A1* | 11/2018 | Kratz | H04Q 9/00 |
| 2019/0384409 | A1* | 12/2019 | Omer | G01S 13/878 |
| 2020/0214006 | A1 | 7/2020 | Choi et al. | |
| 2020/0351576 | A1* | 11/2020 | Beg | G01S 13/003 |
| 2021/0103348 | A1* | 4/2021 | Jeppsson | G06F 3/04845 |

OTHER PUBLICATIONS

Khan et al. “Hand-Based Gesture Recognition for Vehicular Applications Using IR-UWB Radar,” Sensors 2017, 17, 833; doi: 10.3390/s17040833 (Year: 2017).*

* cited by examiner

FIG.5A

501

| DEVICE ID | DESTINATION INFORMATION | ATTRIBUTE | ... |
|---|---|---|---|
| D0001 | ADDRESS 1 | POSITION 11, STATE 1 | ... |
| D0002 | ADDRESS 2 | POSITION 12, STATE 2 | ... |
| ... | ... | ... | ... |

FIG.5B

502

| DETECTION ID | ATTRIBUTE | ... |
|---|---|---|
| S0001 | POSITION 21, TIME 21 | ... |
| S0002 | POSITION 22, TIME 22 | ... |
| ... | ... | ... |

FIG.5C

503

| REGISTRATION ID | PRESENCE FLAG | ATTRIBUTE | ... |
|---|---|---|---|
| R0001 | 0 | POSITION 31, TIME 31 | ... |
| R0002 | 1 | POSITION 32, TIME 32 | ... |
| ... | ... | ... | ... |

FIG.6A

601

| | |
|---|---|
| DIRECTION 0001 | INITIAL STATE CSI VALUE (AMPLITUDE VALUE: XX OR MORE AND XX OR LESS, PHASE VALUE: XX OR MORE AND XX OR LESS) |
| DIRECTION 0002 | INITIAL STATE CSI VALUE (AMPLITUDE VALUE: XX OR MORE AND XX OR LESS, PHASE VALUE: XX OR MORE AND XX OR LESS) |
| ... | ... |

FIG.6B

602

| | | | |
|---|---|---|---|
| DIRECTION 0001 | CSI VALUE AT TIME T11 | CSI VALUE AT TIME T12 | ... |
| DIRECTION 0002 | CSI VALUE AT TIME T21 | CSI VALUE AT TIME T22 | ... |
| ... | ... | ... | ... |

FIG.6C

603

| | |
|---|---|
| DIRECTION 0001 | INITIAL RADAR REFLECTION VALUE (AMPLITUDE VALUE: XX OR MORE AND XX OR LESS, RECEIVING TIME XX SEC. OR MORE AND XX SEC. OR LESS) |
| DIRECTION 0002 | INITIAL RADAR REFLECTION VALUE (AMPLITUDE VALUE: XX OR MORE AND XX OR LESS, RECEIVING TIME XX SEC. OR MORE AND XX SEC. OR LESS) |
| ... | ... |

FIG.6D

604

| | | | |
|---|---|---|---|
| DIRECTION 0001 | RADAR REFLECTION VALUE AT TIME T11 | RADAR REFLECTION VALUE AT TIME T12 | ... |
| DIRECTION 0002 | RADAR REFLECTION VALUE AT TIME T21 | RADAR REFLECTION VALUE AT TIME T22 | ... |
| ... | ... | ... | ... |

FIG.15

1500

| PREDETERMINED EVENT | FREQUENCY BAND TO BE USED | CORRESPONDING PROCESSING | ... |
|---|---|---|---|
| USER'S TRIAL AND ERROR | 60 GHz BAND (CSI) | LEADING TO OPERATION MANUAL | ... |
| USER'S APPROACH | RADAR REFLECTION VALUE, 5 GHz (CSI) | CANCELLING POWER SAVING MODE | ... |
| ... | ... | ... | ... |

INFORMATION PROCESSING SYSTEM, INFORMATION PROCESSING DEVICE, AND INFORMATION PROCESSING METHOD

CROSS-REFERENCE TO RELATED APPLICATION

The present application claims priority under 35 U.S.C. § 119 to Japanese Patent Application No. 2022-046513, filed on Mar. 23, 2022, and Japanese Patent Application No. 2023-020044, filed on Feb. 13, 2023, the contents of which are incorporated herein by reference in their entirety.

BACKGROUND OF THE INVENTION

1. Field of the Invention

The disclosures discussed herein relate to an information processing device, an information processing system, an information processing method, and a non-transitory computer-readable recording medium storing a program.

2. Description of the Related Art

Information processing systems are configured to detect the approach of people to provide predetermined services to the approaching people.

For example, an image processing device is configured to track a person who is present in a predetermined area, and determine, in response to detection of the person's approach, a status of the image processing device, and to make a guidance request to another image processing device according to the determination result (See, e.g., Patent Document 1).

In addition, a wireless communication system is configured to acquire CSI (Channel State Information), which represents a state of radio waves, through wireless LAN (Local Area Network) communication, and to detect a moving direction of an object based on the features extracted from CSI (See, e.g., Patent Document 2).

RELATED-ART DOCUMENTS

Patent Documents

[Patent document 1] Japanese Unexamined Patent Application Publication No. 2016-092638

[Patent document 2] Japanese Unexamined Patent Application Publication No. 2022-017564

SUMMARY OF THE INVENTION

According to an aspect of embodiment, an information processing system configured to use radio waves to sense an action of a user who operates a device is provided. The information processing system includes

- one or more processors; and
- a memory storing a computer-readable program having instructions, which when executed by the one or more processors, cause the one or more processors to execute a process, the process including
- acquiring a state of radio waves in an area where a device is installed;
- receiving information from the device, the information indicating that a predetermined event has been detected; and
- notifying that the predetermined event has occurred at the device, based on a state of radio waves acquired during a predetermined period before the predetermined event and the acquired state of radio waves.

BRIEF DESCRIPTION OF THE DRAWINGS

FIGS. 5A to 5C are diagrams (1) each illustrating an image of management information managed by an information processing system according to an embodiment.

FIGS. 6A to 6D are diagrams (2) each illustrating an image of management information managed by an information processing system according to an embodiment.

FIG. 15 is a diagram illustrating an example of correspondence information according to the second embodiment.

DETAILED DESCRIPTION OF THE PREFERRED EMBODIMENTS

Related art technologies, such as those described in Patent Documents 1 and 2, involve wireless sensing using radio waves to detect a position, a distance, or a direction of movement of an object. In such related art technologies, the higher the frequency used for wireless sensing, the more precise wireless sensing becomes possible. For example, the frequency of 60 GHz or higher enables detection of the shape of an object or the gesture of a person.

However, when wirelessly sensing an action of a user who operates a device, a certain action of a user who operates the device may not be detected by the related art technologies because an operating procedure, physical characteristics, mannerisms for moving the body, and the like vary from user to user, and the arrangement of surrounding objects varies from place to place or time to time, so that a state of radio waves may not be predicted in advance.

In view of the above, one embodiment of the present invention may enable wireless sensing to detect a predetermined action of a user who operates a device.

Hereafter, an embodiment of the invention is described with reference to the accompanying drawings.

<System Configuration>

Figure 1:
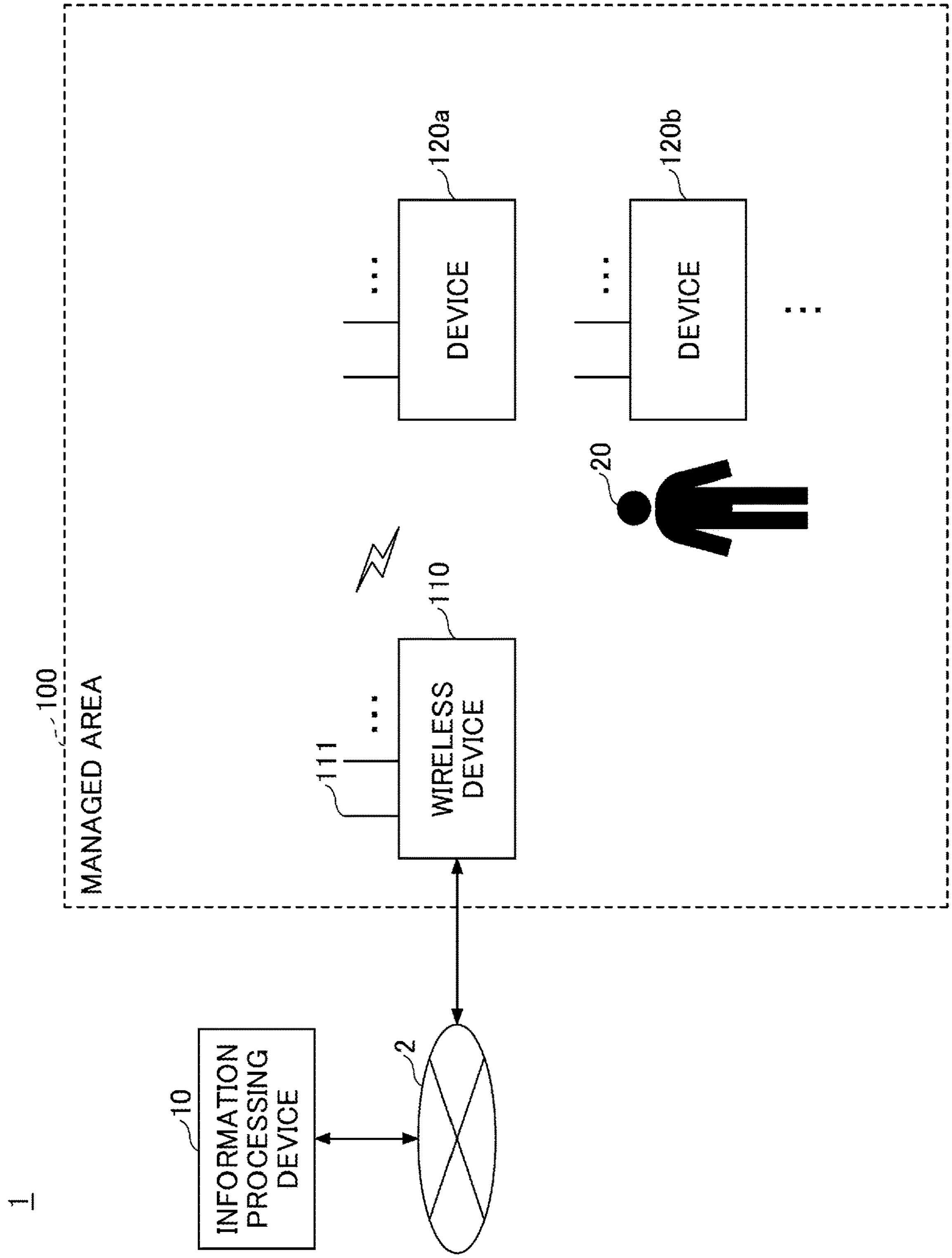
FIG. 1 is a diagram illustrating an example of a system configuration of an information processing system according to an embodiment.

FIG. 1 is a diagram illustrating an example of a system configuration of an information processing system according to an embodiment. The information processing system 1 includes, for example, a wireless device 110 installed in a managed area 100, one or more devices 120*a*, 120*b*, . . . , and an information processing device 10 capable of communicating with the wireless device 110 via a communication network 2. Note that in the following description, "a device 120" is used to indicate any device among one or more devices 120*a*, 120*b*, . . . .

The wireless device 110 is a wireless communication sensing device that has multiple antennas 111 and can perform MIMO (Multi Input Multi Output) and beamforming by phase control. In the example of FIG. 1, the wireless device 110 has a function of an access point for wireless LAN (Local Area Network) communication and is capable of communicating with the device 120 by wireless LAN communication. However, the wireless device 110 is not limited to this example, and may have a function of a wireless base station used in mobile communication.

An example of the managed area 100 is a conference room, where the device 120 such as an image forming device, a projector, or an electronic blackboard is installed. An example of another managed area 100 is a store, where the device 120 such as an image forming device or a digital signage is installed. The managed area 100 may be a conference room or an area other than the store.

The device 120 has, for example, a function of a station for wireless LAN communication, is connected to a wireless LAN network provided by the wireless device 110, and is capable of communicating with the information processing device 10 via the Internet or a communication network 2 such as a LAN. However, the device 120 is not limited to this example, and may be connected to the communication network 2 by a wired LAN or the like without going through the wireless device 110.

The information processing device 10 is an information processing device having a configuration of a computer or a system including multiple computers. By executing a predetermined program, the information processing device 10 performs processing to sense a position or an action of an object (e.g., a person 20 who uses a device 120, etc.) in the managed area 100 based on a state of radio waves transmitted by the wireless device 110.

The state of radio waves transmitted by the wireless device 110 to the information processing device 10 includes, for example, CSI (Channel State Information) acquired by wireless LAN communication. CSI is information that represents a state of a propagation path between transmitters and receivers extracted at the physical layer of wireless communication. CSI represents, for example, amplitude changes due to multipath such as propagation loss, reflection, or diffraction of transmitted radio waves, and phase changes.

Specifically, when multiple subcarriers are used for communication, and the Mt-dimensional transmission vector obtained at the i-th subcarrier is Xi, the Mr-dimensional reception vector obtained at the i-th subcarrier is Yi, and the Mr-dimensional noise vector is Ni, the matrix Hi in the Mt*Mr dimensions, expressed by the following equation 1, is the matrix obtained in the i-th subcarrier.

$$Yi=Hi\ Xi+Ni \qquad \text{(Equation 1)}$$

When each element of Hi is $h_{mn}$, $h_{mn}$ is the value of the CSI of the propagation path between the m-th and n-th receiving antennas.

Note that CSI is an example of a state of radio waves transmitted by the wireless device 110 to the information processing device 10. The wireless device 110 may further have a radar function to, for example, in addition to (or instead of) CSI, transmit a radar reflection value as a state of radio waves to the information processing device 10.

The above configuration enables the information processing system 1 to perform radio sensing to sense an action, position, etc. of a person (user) 20 who operates the device 120, for example, based on the state of radio waves transmitted by the wireless device 110 to the information processing device 10.

The system configuration of the information processing system 1 illustrated in FIG. 1 is an example. For example, the information processing device 10 may be provided in the managed area 100. In addition, the functions of the information processing device 10 may be provided, for example, in the wireless device 110 or in the device 120, or may be distributed among the information processing device 10, the wireless device 110, and the device 120.

<Hardware Configuration>

Next, an example of a hardware configuration of each device included in the information processing system 1 will be described.

(Hardware Configuration of Information Processing Device)

Figure 2:
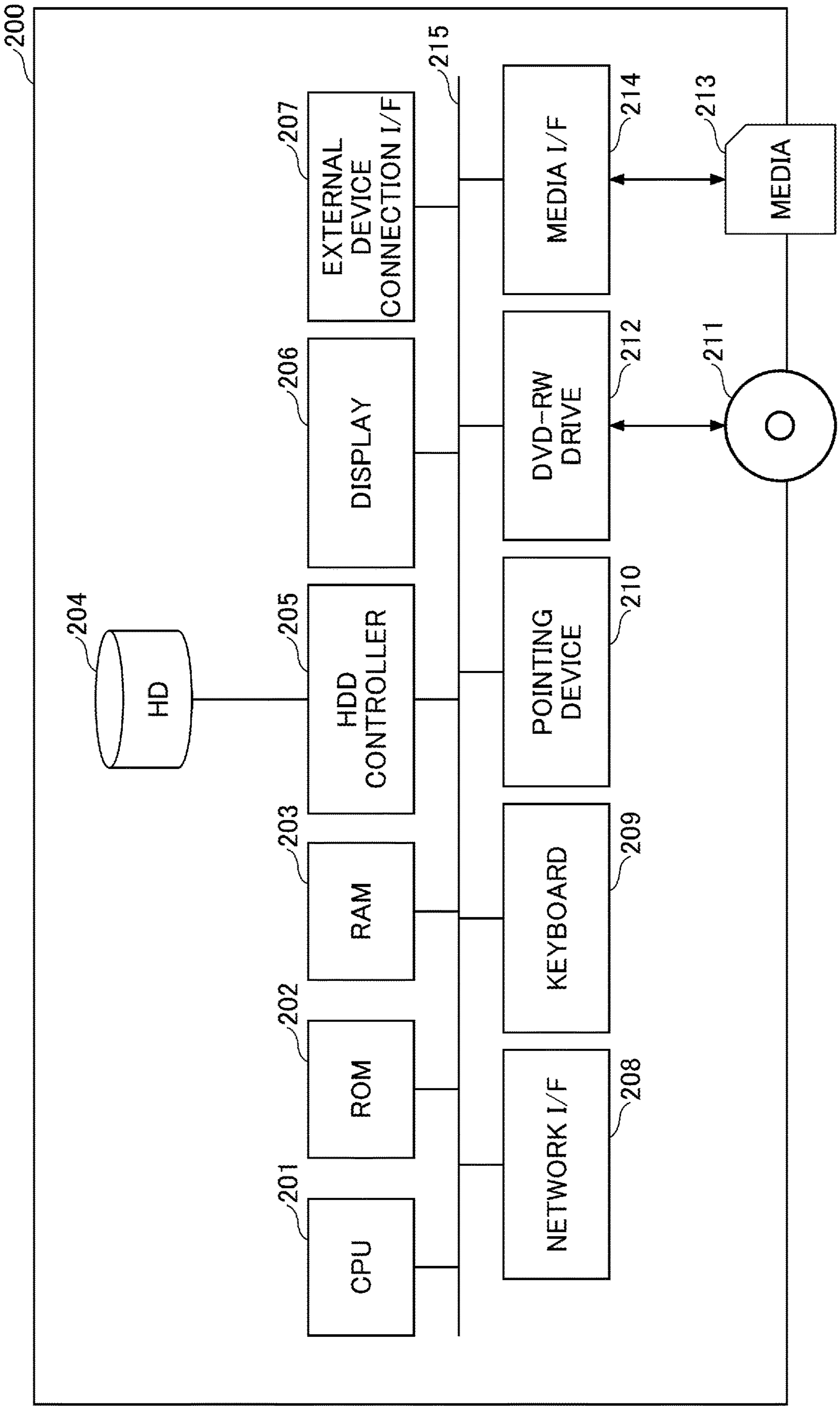
FIG. 2 is a diagram illustrating an example of a hardware configuration of a computer according to an embodiment.

The information processing device 10 has, for example, a hardware configuration of a computer 200 as illustrated in FIG. 2. Alternatively, the information processing device 10 is composed of a plurality of computers 200.

FIG. 2 is a diagram illustrating an example of a hardware configuration of a computer according to an embodiment. The computer 200 includes, for example, a CPU (Central Processing Unit) 201, a ROM (Read Only Memory) 202, a RAM (Random Access Memory) 203, a HD (Hard Disk) 204, a HDD (Hard Disk Drive) controller 205, a display 206, an external device connection I/F (Interface) 207, a network I/F 208, a keyboard 209, a pointing device 210, a DVD-RW (Digital Versatile Disk Rewritable) drive 212, a media I/F 214, and a bus line 215.

Of these, the CPU 201 controls the overall operation of the computer 200. The ROM 202 stores, for example, a program used to start the CPU 201 such as IPL. The RAM 203 is used as a work area or the like of the CPU 201. The HD 204 stores various data such as programs. The HDD controller 205 controls the reading or writing of various data to the HD 204 according to the control of the CPU 201.

The display 206 displays various information such as cursors, menus, windows, characters, or images. The external device connection I/F 207 is an interface for connecting various external devices. The network I/F 208 is an interface for data communication using the communication network 2.

The keyboard 209 is a type of an input unit equipped with multiple keys for input of characters, numbers, various instructions, etc. The pointing device 210 is a type of an input unit for selecting and executing various instructions, selecting objects to be processed, moving a cursor, etc. The DVD-RW drive 212 controls the reading or writing of various data to the DVD-RW 211 serving as an example of a detachable recording medium. The DVD-RW 211 is not limited to the DVD-RW and may be any other recording medium. The media I/F 214 controls the reading or writing (storing) of data to a medium 213 such as a flash memory. The bus line 215 includes an address bus, a data bus, various control signals, etc., for electrically connecting the above components.

(Hardware Configuration of Wireless Device)

Figure 3A:
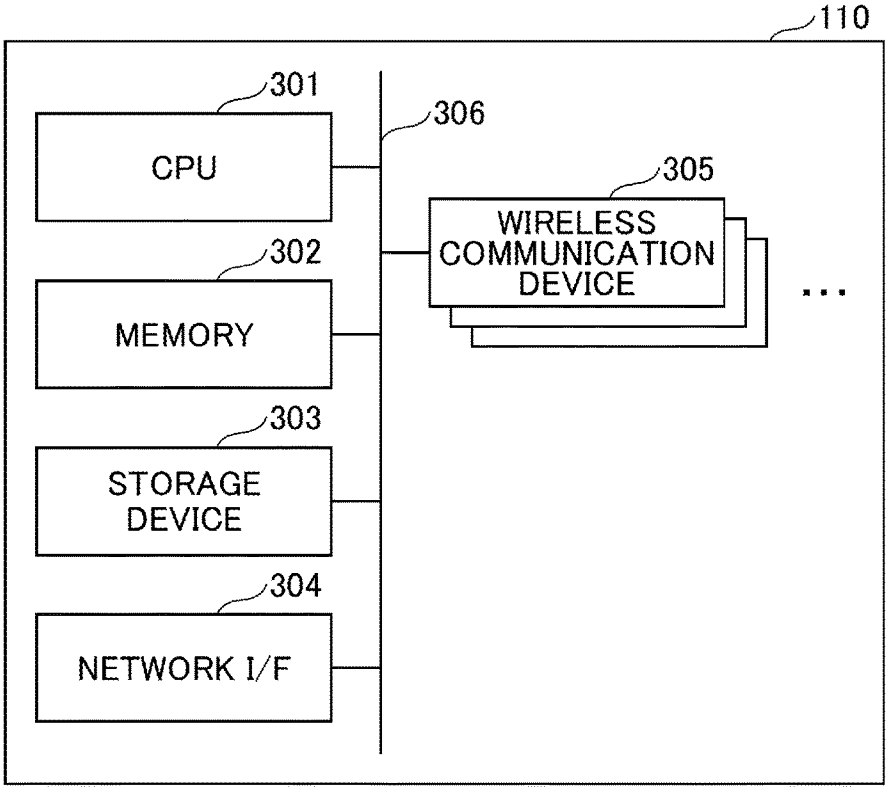
FIGS. 3A and 3B are diagrams illustrating an example of a hardware configuration of a wireless device and a device according to an embodiment.

FIG. 3A illustrates an example of a hardware configuration of the wireless device according to an embodiment. The wireless device 110 has, as an example, a CPU 301, a memory 302, a storage device 303, a network I/F 304, one or more wireless communication devices 305, and a bus 306.

The CPU 301 is an arithmetic unit (processor) that implements each function of the wireless device 110 by, for example, reading programs and data stored in the storage device 303 or the like into the memory 302 and executing processing. The memory 302 includes, for example, a RAM used as a work area of the CPU 301, and a ROM for storing a program for starting the wireless device 110. The storage device 303 is a nonvolatile, large-capacity storage device for storing an OS (Operating System), applications, and various data, and is implemented by, for example, an SSD (Solid State Drive) or an HDD.

The network I/F 304 is an interface for communicating with the information processing device 10, etc., using the communication network 2. One or more wireless communication devices 305 include, for example, wireless circuits, antennas, and communication control devices, etc., that perform wireless LAN communication or wireless WAN (Wide Area Network) communication and obtain CSI. A bus 306 is commonly connected to each of the above components and transmits, for example, address signals, data signals, and various control signals.

(Hardware Configuration of Device)

Figure 3B:
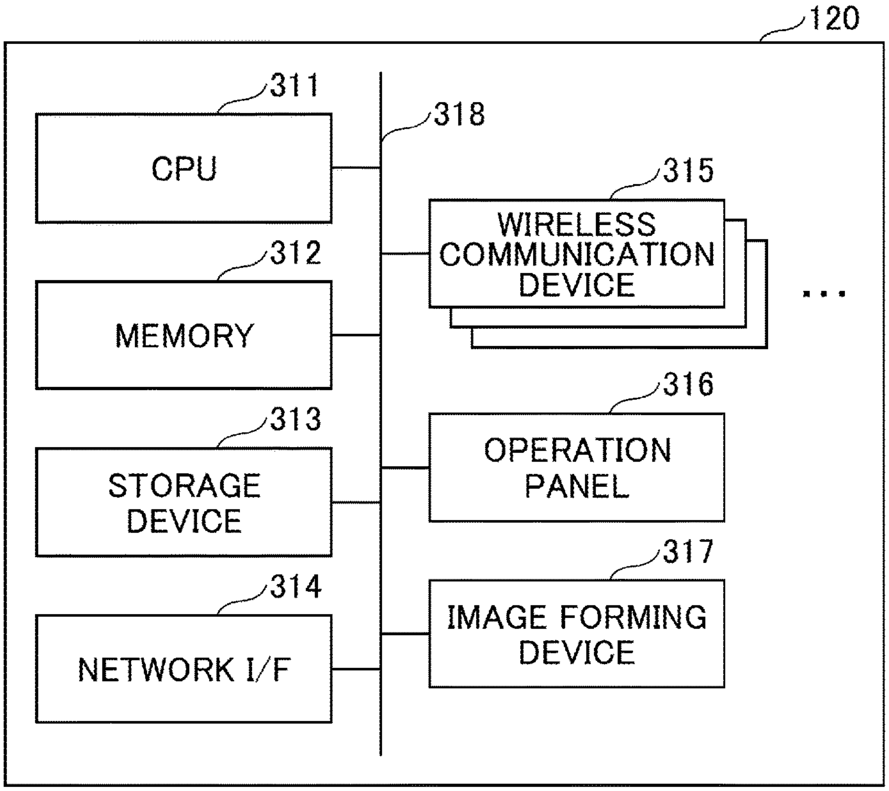

FIG. 3B illustrates an example of a hardware configuration of a device according to an embodiment. The example in FIG. 3B illustrates a hardware configuration when the device 120 is an image forming device such as a copier, printer, or multifunction device.

The device 120 has, as an example, a CPU 311, a memory 312, a storage device 313, a network I/F 314, one or more wireless communication devices 315, an operation panel 316, an image forming device 317, and a bus 318. Since the CPU 311, the memory 312, the storage device 313, the network I/F 314, and the bus 318 are similar to the CPU 301, the memory 302, the storage device 303, the network I/F 304, and the bus 306 described in FIG. 3A, the description is omitted.

One or more wireless communication devices 315 include wireless circuits, antennas, communication control devices and the like of the same wireless communication system as one or more wireless communication devices 305 provided in the wireless device 110. The operation panel 316 includes a display for displaying an operation screen, etc., and a touch panel or an operation button, etc. for receiving an operation on the operation screen, etc. The image forming device 317 includes a device for forming an image, such as a printer engine for printing or a scan engine for scanning.

The hardware configuration of the device 120 illustrated in FIG. 3B is an example. For example, when the device 120 is a device other than an image forming device, the device 120 need not have an image forming device 317.

<Functional Configuration>

Figure 4:
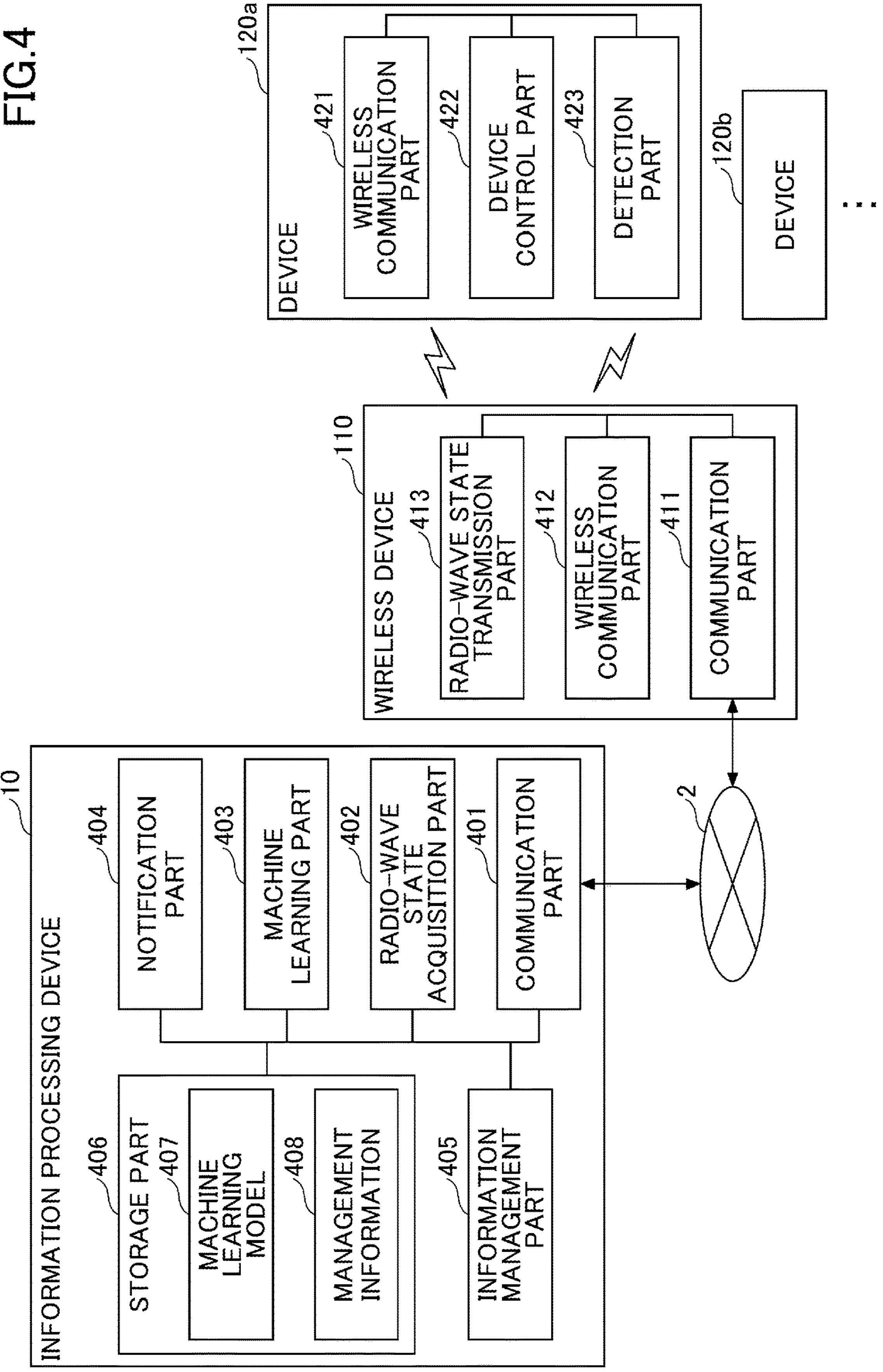
FIG. 4 is a diagram illustrating an example of a functional configuration of an information processing system according to an embodiment.

Next, a functional configuration of the information processing system according to an embodiment will be described. FIG. 4 is a diagram illustrating an example of a functional configuration of an information processing system according to an embodiment. In FIG. 4, it is assumed that a device 120*b* has the same functional configuration as the device 120*a*.

(Functional Configuration of Information Processing Device)

In the information processing device 10, for example, a CPU 201 executes a predetermined program to implement a functional configuration of a communication part 401, a radio-wave state acquisition part 402, a machine learning part 403, a notification part 404, an information management part 405, a storage part 406, etc. At least some of the above functional configurations may be implemented by hardware.

The communication part 401 connects the information processing device 10 to the communication network 2 using, for example, the network I/F 208, and communicates with the wireless device 110, the device 120, etc. For example, the communication part 401 performs reception processing to receive information indicating that a predetermined event has been detected from the device 120.

The radio-wave state acquisition part 402 performs radio-wave state acquisition processing to acquire a state of radio waves in the managed area 100 from the wireless device 110 via the communication part 401. For example, the radio-wave state acquisition part 402 acquires CSI (an example of a state of radio waves) acquired by wireless LAN communication or the like from the wireless device 110. Note that the radio-wave state acquisition part 402 may acquire radar reflection values (another example of a state of radio waves) from the wireless device 110 instead of (or in addition to) CSI.

For example, the machine learning part 403 stores a machine learning model 407 for estimating an action of a person 20 who operates the device 120 in a storage part 406 or the like. The machine learning part 403 also executes machine learning processing for training the machine learning model 407 to learn a state of radio waves during a predetermined period before a predetermined event, for example, by using the detection of the predetermined event by the device 120 as training data.

The machine learning part 403 determines whether the predetermined event has occurred at the device 120, based on the state of radio waves (e.g., CSI) acquired by the radio-wave state acquisition part 402 and the trained machine learning model 407.

The notification part 404 notifies that the predetermined event has occurred at the device 120, based on the state of radio waves acquired by the radio-wave state acquisition part 402 during the predetermined period before the predetermined event and the state of radio waves acquired by the radio-wave state acquisition part 402. For example, when the machine learning part 403 determines that the predetermined event has occurred at the device 120, the notification part 404 performs notification processing to notify the device 120 that the predetermined event has occurred through the communication part 401.

The information management part 405 stores and manages management information 408 such as a registered device list 501, a detected object list 502, a registered object list 503, a CSI initial state list 601, and a CSI history list 602, which will be described later, in a storage part 406 or the like. In addition to (or instead of) the CSI initial state list 601 and the CSI history list 602, the information management part 405 may manage a radar reflection value initial state list 603, a radar reflection value history list 604, or the like.

The storage part 406 is implemented by, for example, a program executed by the CPU 201, an HD 204, an HDD controller 205, a RAM 203 or the like. The storage part 406 performs storage processing to store, for example, a machine learning model 407 that is trained by machine learning with detection of a predetermined event by the device 120 and a state of radio waves during the predetermined period before the detected predetermined event, as training data. The storage part 406 also stores various information, data, programs, etc., including the management information 408.

(Functional Configuration of Wireless Device)

In the wireless device 110, for example, a CPU 301 executes a predetermined program to implement a functional configuration such as a communication part 411, a wireless communication part 412, and a radio-wave state transmission part 413. At least some of the above functional configurations may be implemented by hardware.

The communication part 411 connects the wireless device 110 to the communication network 2 using, for example, the network I/F 304, and communicates with the information processing device or the like.

The wireless communication part 412 makes the wireless communication device 305 function as, for example, an access point for wireless LAN communication, and relays communication between the information processing device 10 and the device 120.

The radio-wave state transmission part 413 acquires CSI (an example of a state of radio waves) within the managed area 100 using, for example, the wireless communication device 305, and transmits the acquired CSI to the information processing device 10 via the communication part 411. The radio-wave state transmission part 413 may also transmit the radar reflection value (another example of a state of radio waves) in addition to (or instead of) the CSI to the information processing device 10 via the communication part 411.

(Functional Configuration of Device)

In the device 120, for example, a CPU 311 executes a predetermined program to implement a functional configuration such as a wireless communication part 421, a device control part 422, and a detection part 423. At least some of the above functional configurations may be implemented by hardware.

The wireless communication part 421 makes the wireless communication device 315 function, for example, as a station for wireless LAN communication, and communicates with the information processing device 10 via the wireless device 110.

As an example, the device control part 422 controls the operation panel 316, the image forming device 317, and the like to make the device 120 function as an image forming device. For example, the device control part 422 displays an operation screen on the operation panel 316 and performs image forming processing such as copying, printing, or scanning according to the operation of the person 20 on the operation screen. The device control part 422 makes the device 120 function as a projector when the device 120 is a projector, and makes the device 120 function as an electronic blackboard when the device 120 is an electronic blackboard.

The detection part detects a predetermined event in the device 120, and when the predetermined event has been detected, the detection part 423 notifies the information processing device 10 of the occurrence of the predetermined event via the wireless communication part 421, etc. As a specific example, the detection part 423 detects a user who is confused about the operation of the device 120, the user's trial and error, or the like as the predetermined event.

For example, when the device 120 is an image forming device such as a copier, a printer, or a multifunction machine, the detection part 423 may detect that a predetermined event has occurred when a user opens and closes a paper feed tray, a cover of a transport path, and the like a predetermined number of times (e.g., 3 times). Alternatively, the detection part 423 may detect that a predetermined event has occurred when a user displays a predetermined operation screen of the operation panel 316 a predetermined number of times (e.g., 5 times).

<Example of Management Information>

Next, an example of the management information 408 managed by the information management part 405 will be described. FIGS. 5A to 5C and FIGS. 6A to 6D each illustrate an image of management information managed by the information processing system according to an embodiment.

(Registered Device List)

FIG. 5A illustrates an image of the registered device list 501 managed by the information management part 405. The registered device list 501 is a list that manages information about devices 120*a*, 120*b*, . . . , etc. in the managed area 100. In the example of FIG. 5A, the registered device list 501 includes information such as a "device ID", "destination information", and "attribute" as items.

The device ID is identification information that identifies the device 120. The "destination information" is destination information (address information, etc.) for the information processing device 10 to communicate with the device 120. The "attribute" is information that accompanies the device 120, such as a position (three-dimensional coordinates) and a status (e.g., power on/off, operating mode, certification required, etc.) of the device 120, which is necessary for the management of the device 120.

(Detected Object List)

FIG. 5B illustrates an image of the detected object list 502 managed by the information management part 405. The detected object list 502 is a temporary list used to identify objects (people 20, etc.) existing in the managed area 100 and update the registered object list 503. In the example of FIG. 5B, the detected object list 502 includes information such as a "detection ID" and "attribute" as items. The "detection ID" is identification information that identifies a detected object. The "attribute" is information that accompanies the detected object, such as a position (three-dimensional coordinates) of an object and a detection time, which are necessary for managing an object.

(Registered Object List)

FIG. 5C illustrates an image of the registered object list 503 managed by the information management part 405. The registered object list 503 is a list that manages information of objects (people 20, etc.) existing in the managed area 100. In the example of FIG. 5C, the registered object list 503 includes information such as a "registration ID", "presence flag", "attribute", etc., as items. The "registration ID" is identification information that identifies an object. The "presence flag" is flag information indicating whether each object exists (1) or does not exist (0) in the managed area 100. The "attribute" is information that accompanies the registered object, such as a position (three-dimensional coordinates) of an object and a detection time, which are necessary for managing an object.

(CSI Initial State List)

FIG. 6A illustrates an image of the CSI initial state list 601 managed by the information management part 405. The CSI initial state list 601 is a list that stores the initial state CSI obtained in each scanning direction by spatial scanning using known beam forming in the managed area 100.

(CSI History List)

FIG. 6B illustrates an image of the CSI history list 602 managed by the information management part 405. The CSI history list 602 is a list that stores a history of the value of CSI for each scanning direction acquired by the wireless device 110 at every predetermined time by spatial scanning using known beamforming.

(Radar Reflection Value Initial State List)

FIG. 6C illustrates an image of the radar reflection value initial state list 603 managed by the information management part 405. In performing radio sensing in the frequency band of millimeter wave or higher, the wireless device 110 can perform radar type sensing by applying radio waves to an object to identify a position of the object by the reflected waves. The radar reflection value initial state list is a list that stores the initial state radar reflection values obtained for each scanning direction by radar type sensing.

(Radar Reflection Value History List)

FIG. 6D illustrates an image of the radar reflection value history list 604 managed by the information management part 405. The radar reflection value history list 604 is a list that stores a history of radar reflection values in each scanning direction acquired by the wireless device 110 at predetermined time intervals in radar system sensing.

<Procedure of Position Detection Processing>

Next, a procedure of position detection processing in which the information processing system 1 detects and tracks a position of an object such as a person 20 in the managed area 100 will be described.

(Position Detection Processing)

Figure 7:
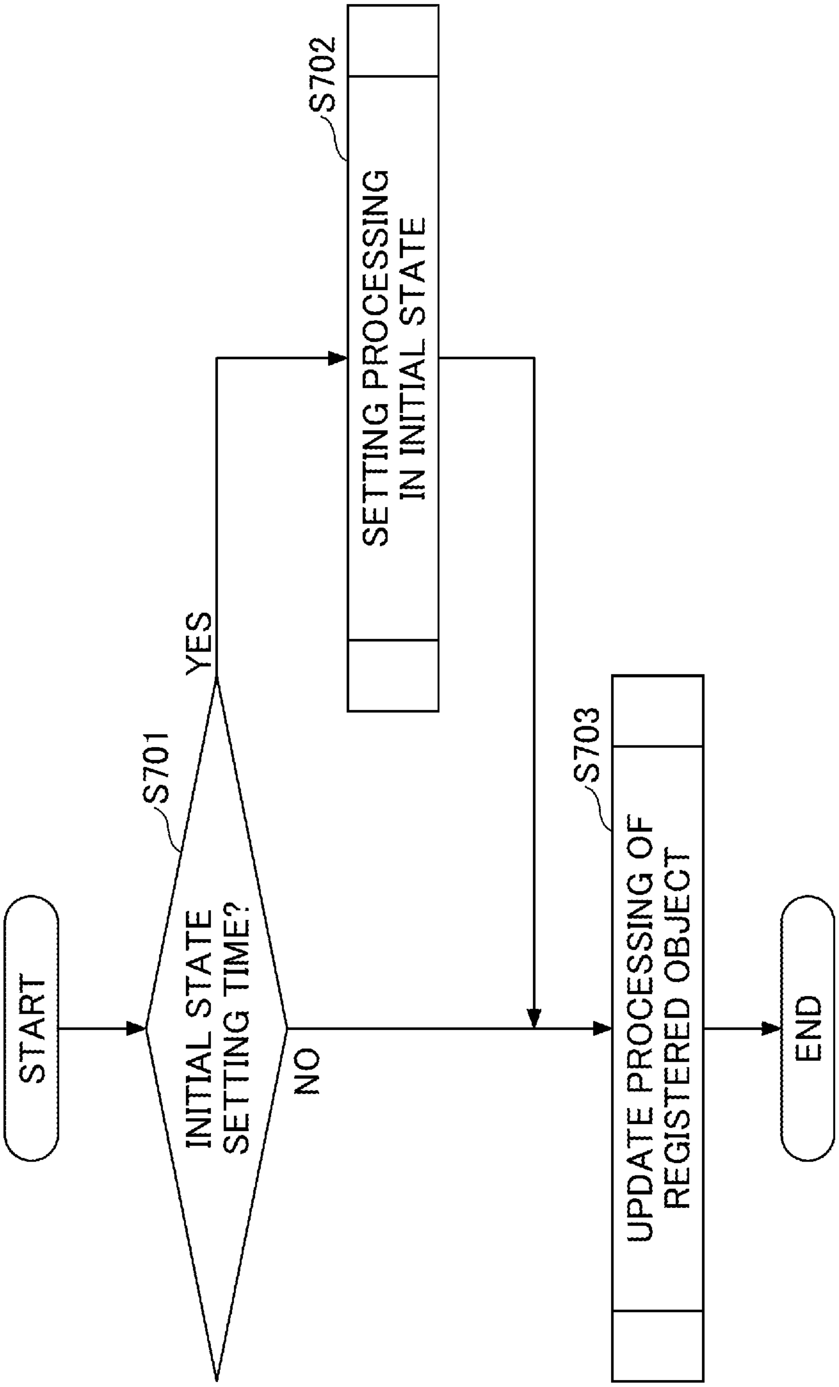
FIG. 7 is a flowchart illustrating an example of position detection processing according to an embodiment.

FIG. 7 is a flowchart illustrating an example of position detection processing according to an embodiment. This processing illustrates the overall procedure of position detection processing repeatedly performed by the information processing system 1.

In step S701, the information management part 405 determines whether the time is set at an initial state setting time at which the initial state setting processing is performed. The initial state setting processing is the processing for setting an initial state (a reference state) in which no visitors or temporary devices are present in the managed area 100.

For example, when the managed area 100 is an unmanned store, a state of radio waves is set as an initial state in the unmanned state before the unmanned store is open. It is assumed that the initial state does not change frequently, but the initial state changes due to, for example, the introduction of a new device into the store or the movement of product shelves. In addition, when the managed area 100 is a factory, the initial state changes due to, for example, the rearrangement of lines. Therefore, it is desirable to set the initial state periodically (e.g., twice a day, etc.).

When the time is set at the initial state setting time, the information management part 405 moves the processing to step S702. On the other hand, when the time is not set at the initial state setting time, the information management part 405 moves the processing to step S702.

When the processing moves to step S702, the information management part 405 executes the setting processing in the initial state. For example, the information management part 405 executes the setting processing in the initial state described later in FIGS. 8A and 8B.

When the processing moves to step S703, the information management part 405 executes the update processing of the registered object described later in FIGS. 9A to 11B, for example.

(Initial State Setting Processing 1)

Figure 8A:
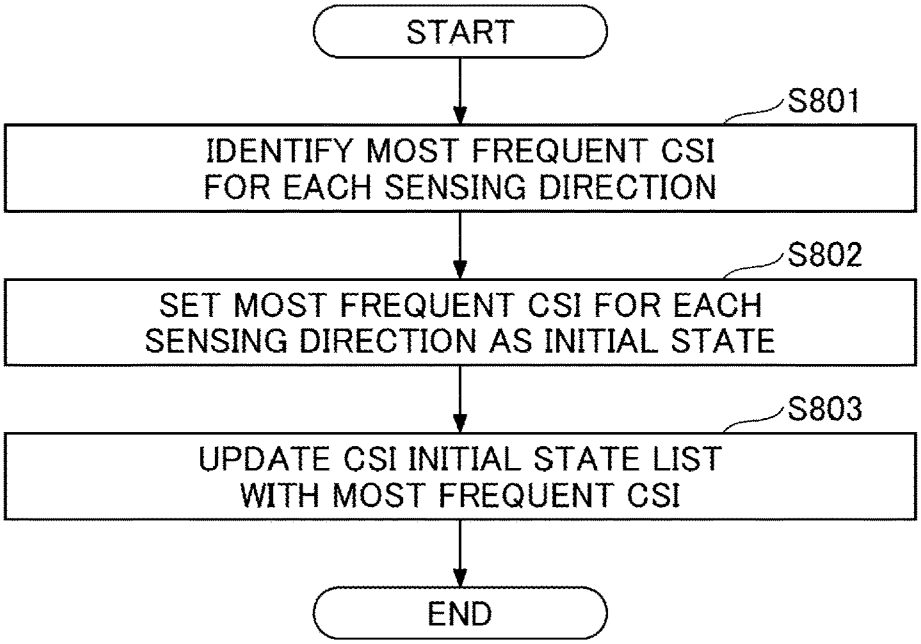
FIGS. 8A and 8B are flowcharts each illustrating an example of initial state setting processing according to an embodiment.

FIG. 8A is a flowchart illustrating an example of initial state setting processing according to an embodiment. This processing illustrates an example of the processing executed by the information management part 405 in step S702 in FIG. 7.

In step S801, the information management part 405 identifies the most frequent CSI for each sensing direction from the CSI history list 602 as illustrated in FIG. 6B, for example.

In step S802, the information management part 405 sets the most frequent CSI for each sensing direction as the initial state. For example, when the managed area 100 is a store, the most frequent CSI is set to the initial state (the reference state) because the time when no person is present is considered to be the longest in each sensing direction, such as when no customer is present and when the store is closed.

In step S803, the information management part 405 updates the CSI initial state list 601 as illustrated in, for example, FIG. 6A with the most frequent CSI for each sensing direction.

By the processing of FIG. 8A, the information management part 405 can periodically update the CSI initial state list 601 as illustrated in FIG. 6A.

Figure 8B:
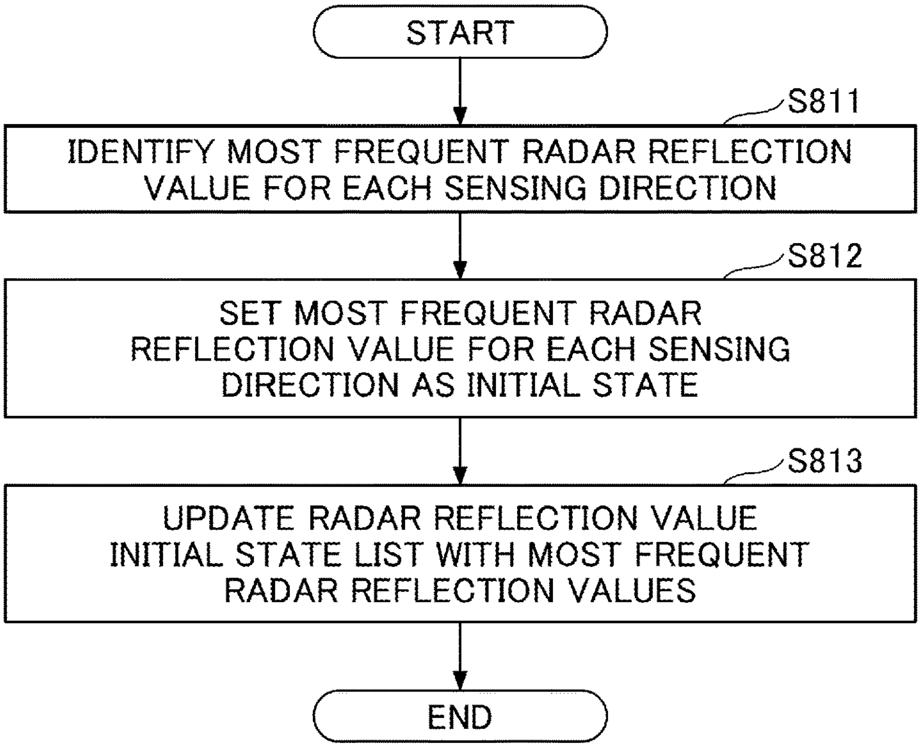

In addition to (or instead of) the processing illustrated in FIG. 8A, the information management part 405 may perform initial state setting processing 2 illustrated in FIG. 8B.

(Initial State Setting Processing 2)

FIG. 8B is a flowchart illustrating another example of initial state setting processing according to an embodiment. This processing illustrates another example of processing executed by the information management part 405 in step S702 of FIG. 7.

In step S811, the information management part 405 identifies the most frequent radar reflection value for each sensing direction from, for example, the radar reflection value history list 604 as illustrated in FIG. 6D.

In step S812, the information management part 405 sets the most frequent radar reflection value for each sensing direction as the initial state.

In step S813, the information management part 405 updates the radar reflection value initial state list 603 as illustrated in, for example, FIG. 6C with the most frequent radar reflection value for each sensing direction.

By processing in FIG. 8B, the information management part 405 can periodically update the radar reflection value initial state list 603 as illustrated in FIG. 6C.

For example, when the CSI initial state list 601 is obtained as illustrated in FIG. 6A, the processing in FIG. 8B may be omitted (or may not be omitted). On the other hand, when, for example, the CSI is desired to be obtained in the millimeter-wave band, but the device 120 does not support the millimeter-wave band, the information processing system 1 may create the radar reflection value initial state list 603 as illustrated in FIG. 6C and perform radio sensing by the radar reflection value. Also, when there are few devices 120 supporting the millimeter-wave band, the information processing system 1 may perform radio sensing by using the CSI initial state list 601 as illustrated in FIG. 6A in combination with the radar reflection value initial state list 603 as illustrated in FIG. 6C. Furthermore, the information processing system 1 may perform radio sensing by constantly using the CSI initial state list 601 as illustrated in FIG. 6A in combination with the radar reflection value initial state list 603 as illustrated in FIG. 6C.

(Update of Registered Objects)

Figure 9A:
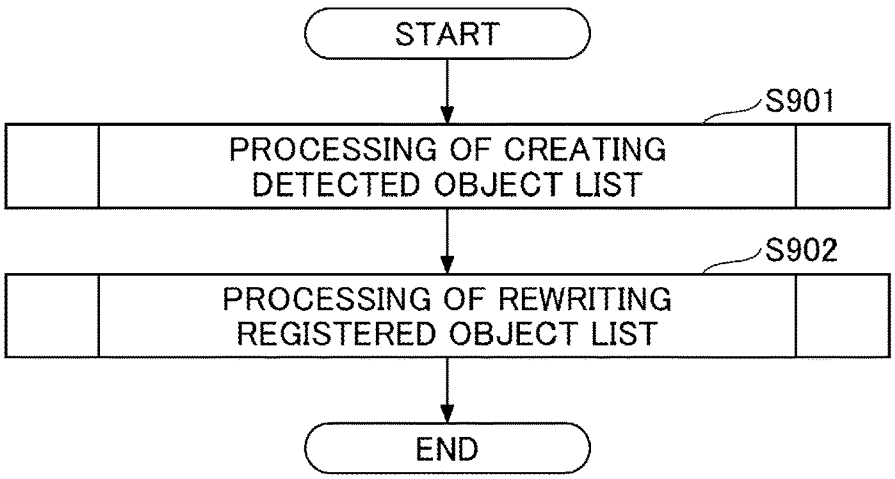
FIGS. 9A and 9B are flowcharts each illustrating an example of update processing of registered objects according to an embodiment.

FIG. 9A is a flowchart illustrating an example of update processing of registered objects according to an embodiment. This processing illustrates, for example, the overall procedure of update processing of registered objects executed by the information processing system 1 in step S703 of FIG. 7.

In step S901, the information management part 405 executes processing of creating a detected object list. The information management part 405 executes processing of creating a detected object list described later in FIG. 9B, for example.

In step S902, the information management part 405 executes processing of rewriting the registered object list. The information management part 405 executes processing of rewriting the registered object list described later in FIG. 10 and FIGS. 11A and 11B, for example.

(Processing of Creating Detected Object List)

Figure 9B:
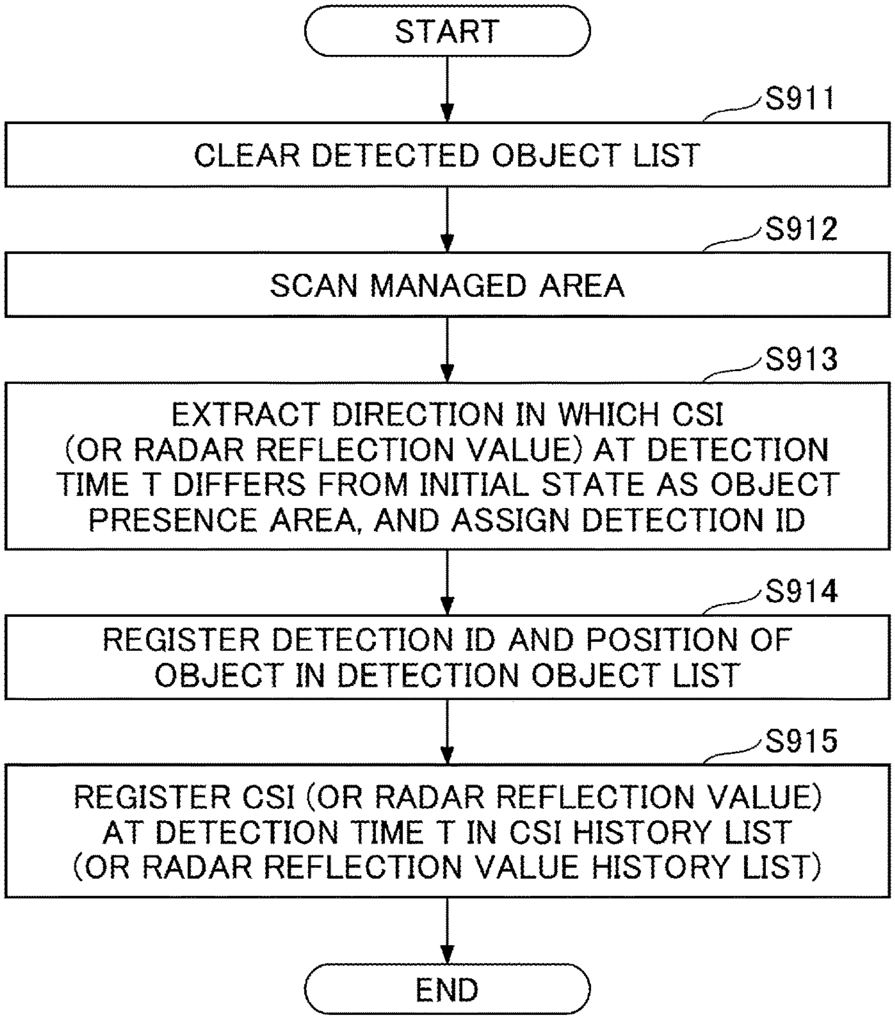

FIG. 9B is a flowchart illustrating an example of processing of creating a detected object list. This process illustrates an example of the processing executed by the information management part 405 in step S901 in FIG. 9A, for example.

In step S911, the information management part 405 clears the detected object list 502. For example, the information management part 405 erases the data contained in the detected object list 502 as illustrated in FIG. 5B.

In step S912, the information management part 405 issues an instruction to the wireless device 110 to scan the managed area 100. Herein, scanning means acquiring CSI (or radar reflection value) in each predetermined direction. The predetermined direction corresponds, for example, to each of directions 0001, 0002, . . . in CSI initial state list 601 (or radar reflection value initial state list 603).

The scanning in each direction is performed by known beamforming. Beamforming is a technique in which the intensity (amplitude) of radio waves is controlled for each angle by changing an interference condition by changing a phase of the transmitted waves among the antennas 111 when radio waves are transmitted from the wireless device 110.

In step S913, the information management part 405 extracts the direction in which the CSI (or radar reflection value) at the detection time T differs from that in the initial state as an object presence area, and assigns a detection ID. For example, the information management part 405 may determine that the amplitude value and the phase value of the CSI at the detection time T differ from those in the initial state when these values are not included between the maximum and minimum values of the CSI initial state list.

In step S914, the information management part 405 registers the detection ID assigned in step S913 and the position of an object in the detected object list 502 as illustrated in FIG. 5B. The position of the object is a position on three-dimensional coordinates. The information management part 405 may calculate the position of the object from, for example, the direction of the scan and the distance to the object calculated from the time until the radar reflected wave reaches the wireless device 110. Alternatively, the information management part 405 may estimate the distance to the object by applying machine learning to the CSI.

In step S915, the information management part 405 registers the CSI (or radar reflection value) at the detection time T in the CSI history list 602 (or radar reflection value history list 604).

Through the processing of FIG. 9B, the information processing system 1 can detect objects existing in the managed area 100 and register these objects in the detected object list 502.

(Processing of Rewriting Registered Objects)

Figure 10:
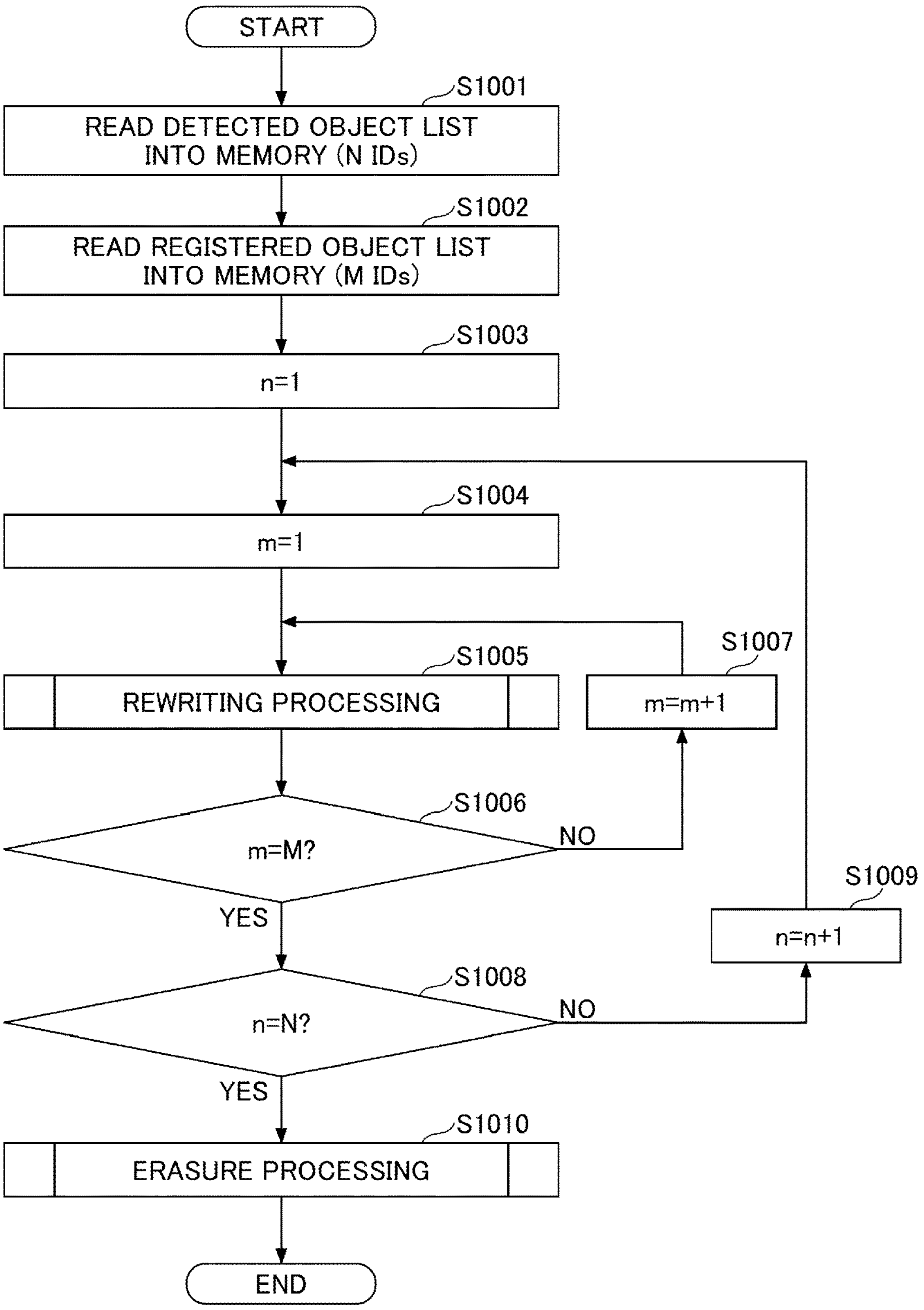
FIG. 10 is a flowchart (1) illustrating an example of rewriting processing of the registered object list according to an embodiment.
Figure 11A:
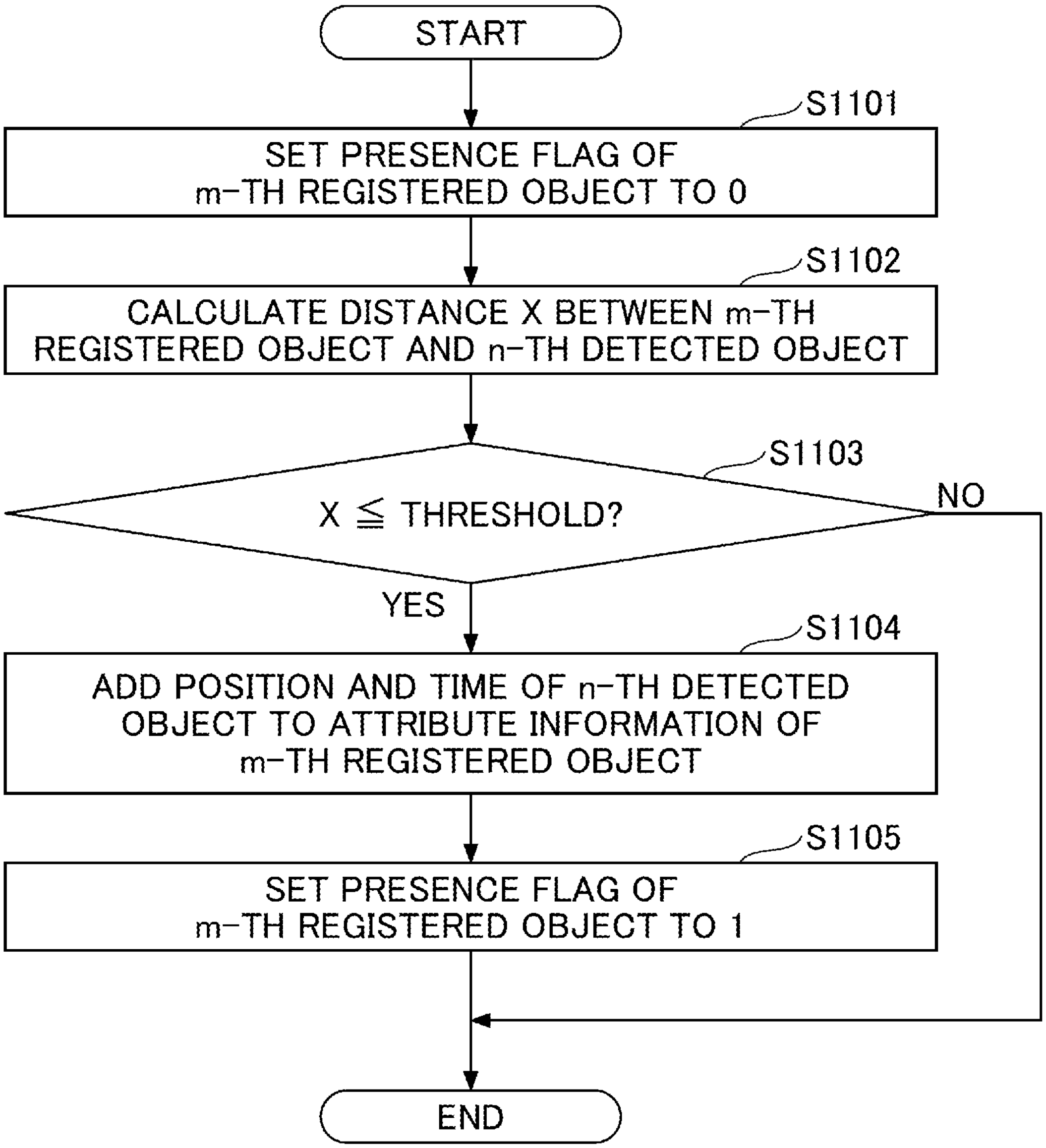
FIGS. 11A and 11B are flowcharts (2) each illustrating an example of rewriting processing of the registered object list according to an embodiment.
Figure 11B:
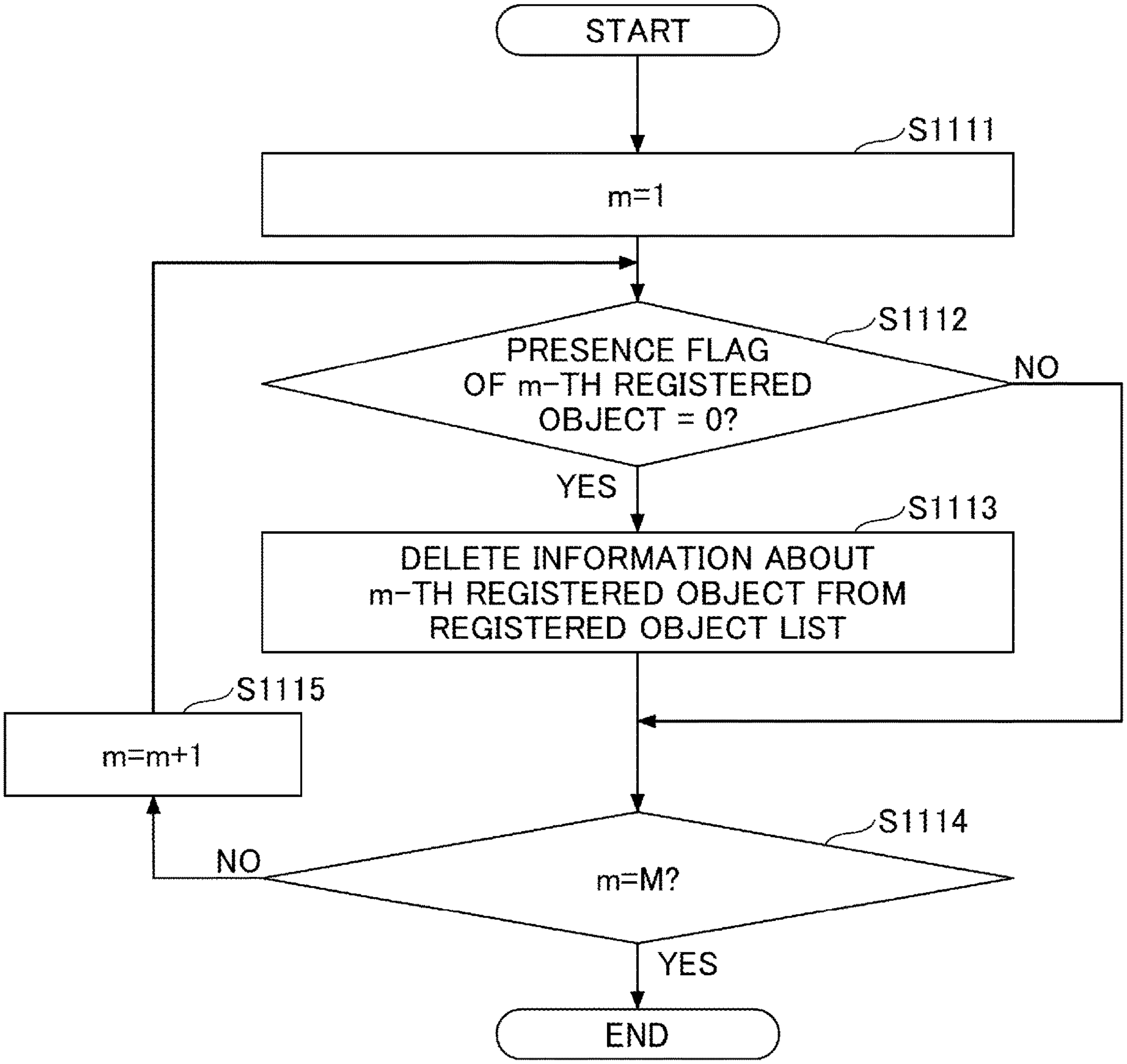

FIG. 10 and FIGS. 11A and 11B are flowcharts illustrating examples of processing of rewriting the registered object list according to an embodiment. This processing illustrates, for example, an example of processing executed by the information management part 405 in step S902 in FIG. 9A.

In step S1001, the information management part 405 reads the detected object list 502 into a memory such as a RAM 203. Herein, the number of detected IDs registered in the detected object list 502 is N.

In step S1002, the information management part 405 reads the registered object list 503 into a memory such as the RAM 203. Herein, the number of registered IDs registered in the registered object list 503 is M.

In step S1003, the information management part 405 initializes the variable n to 1. In step S1004, the information management part 405 initializes the variable m to 1.

In step S1005, the information management part 405 executes the rewriting processing described later in FIG. 11A.

In step S1006, the information management part 405 determines whether m=M is true. When m=M is not true, the information management part 405 adds 1 to m in step S1007 and returns the processing to step S1005. On the other hand, when m=M is true, the information management part 405 moves the processing to step S1008.

When the processing moves to step S1008, the information management part 405 determines whether n=N is true. When n=N is not true, the information management part 405 adds 1 to n in step S1009 and returns the processing to step S1004. On the other hand, when n=N is true, the information management part 405 moves the processing to step S1010.

With the above processing, the rewriting processing of step S1005 can be executed on a round-robin basis for each data included in the detected object list 502 and each data included in the registered object list 503.

When the processing moves to step S1010, the information management part 405 executes erasure processing described later in FIG. 11B.

(Rewriting Processing)

FIG. 11A is a flowchart illustrating an example of the rewriting processing. This processing illustrates an example of the processing executed by the information management part 405 in step S1005 of FIG. 10, for example.

In step S1101, the information management part 405 sets the presence flag of the m-th registered object to 0.

In step S1102, the information management part 405 calculates a distance X between the m-th registered object and the n-th detected object. For example, the information management part 405 calculates the distance X, based on the position of the m-th registered object and the position of the n-th detected object.

In step S1103, the information management part 405 determines whether the distance X is less than or equal to a threshold. Herein, the threshold is assumed to be a value set in advance for determining that the m-th registered object and the n-th detected object are the same object. When the distance X is equal to or less than the threshold, the information management part 405 moves the processing to step S1104. On the other hand, when the distance X is not equal to or less than the threshold, the information management part 405 terminates the processing illustrated in FIG. 11A.

When the processing moves to step S1104, the information management part 405 adds (overwrites) the position and time of the n-th detected object to the attribute information of the m-th registered object.

In step S1105, the information management part 405 sets a presence flag of the m-th registered object to 1.

According to the processing of FIG. 11A, when the distance X between the m-th registered object and the n-th detected object is less than or equal to the threshold, the information management part 405 determines that these two objects indicate the same object and updates the attribute of the m-th registered object with the attribute of the n-th detected object.

(Erasure Processing)

FIG. 11B is a flowchart illustrating an example of erasure processing. This processing illustrates an example of processing executed by the information management part 405 in step S1010 of FIG. 10, for example.

In step S1111, the information management part 405 initializes the variable m to 1.

In step S1112, the information management part 405 determines whether the presence flag of the m-th registered object is 0. When the presence flag of the m-th registered object is 0, the information management part 405 moves the processing to step S113. On the other hand, when the presence flag of the m-th registered object is not 0, the information management part 405 moves the processing to step S1114.

When the processing moves to step S1113, the information management part 405 deletes the information about the m-th registered object from the registered object list 503.

When the processing moves to step S1114, the information management part 405 determines whether m=M is true. When m=M is not true, the information management part 405 adds 1 to m in step S1115 and returns the processing to step S1112. On the other hand, when m=M is true, the information management part 405 terminates the processing in FIG. 11B.

By the processing in FIG. 11B, the information management part 405 can delete the information about a non-existent object from the registered object list 503.

With the position detection processing described above in FIGS. 7 to 11B, the information processing system 1 can detect and track the position of the object in the managed area 100 using the wireless device 110.

<Action Detection Processing>

Next, action detection processing in which the information processing system 1 uses radio waves to sense an action of a person 20 who operates the device 120 in the managed area 100 will be described.

(Overview)

Radio waves have long been used for object detection and distance measurement, and the higher the frequency, the more accurate the sensing becomes. At frequencies above 60 GHz, for example, object shapes and gestures can become targets for detection. Gestures vary widely due to details of work, physical characteristics, and mannerisms of moving the body, and it is difficult to algorithmize those gestures as radio wave state patterns. Thus, much of the previous research on action sensing has placed a strong emphasis on combining the research with machine learning.

However, an action of a person 20 who operates the device 120 varies, for example, according to details of the work, physical characteristics, or physical condition, and it has been difficult to train a machine learning model so that the person's action can be sensed based on a radio wave state pattern.

Therefore, in this embodiment, machine learning is facilitated by associating the action of the person 20 that the device 120 desires to detect with the device operation, and notifying the fact that a predetermined device operation has been performed as ground truth data from the device to the information processing device 10. For example, the information processing device 10 uses a state of radio waves (e.g., CSI) immediately before the predetermined device operation is performed as ground truth data to train the machine learning model.

First Embodiment

A procedure of processing of an information processing method according to a first embodiment will be described. Herein, as an example, the following description is given in which the information processing system 1 detects an action of a person 20 who is confused about an operation of the device 120.

<Machine Learning Processing>

(Device Processing)

Figure 12A:
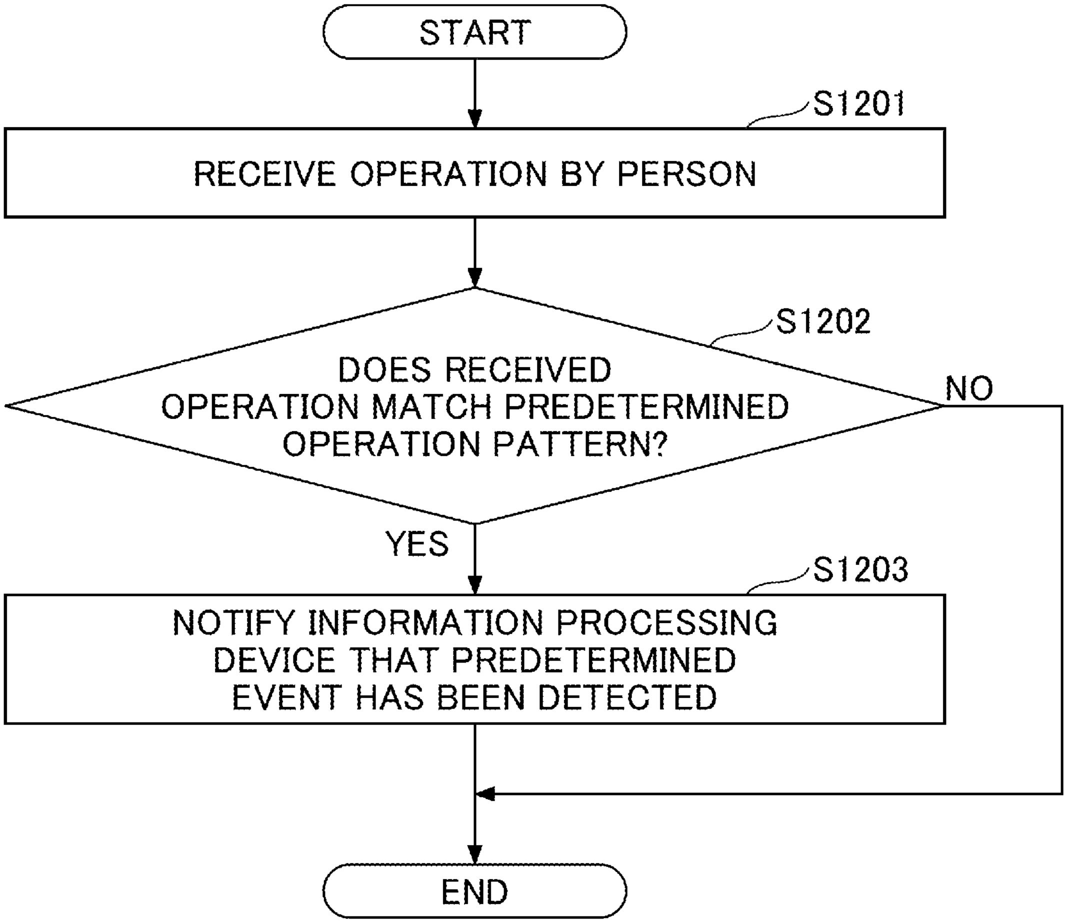
FIGS. 12A and 12B are flowcharts each illustrating an example of machine learning according to a first embodiment.

FIG. 12A is a flowchart illustrating an example of processing of a device during machine learning.

In step S1201, when the device control part 422 of the device 120 receives an operation on the device 120 by the person 20, the device 120 executes processing in step S1202 onward.

In step S1202, the detection part 423 of the device 120 determines whether the received operation matches a predetermined operation pattern set in advance.

For example, when detecting an action of a person 20 who is confused about an operation of the device 120, a trial and error operation of the device 120 by the person 20 may be detected. The occurrence of this trial and error can be detected through the operation of the device 120. For example, when the person 20 once selects an operation button and then performs an operation to return to the original screen, a first operation can be determined as a misoperation. Similarly, when the person 20 changes setting conditions of an operation that has been performed once and then performs the operation again, the first operation can be determined as a misoperation. In this embodiment, such a pattern of misoperation or a pattern of trial and error operation is set in advance in the device 120.

When the received operation matches the predetermined operation pattern, the detection part 423 moves the processing to step S1203. On the other hand, when the received operation does not match the predetermined operation pattern, the detection part 423 terminates the processing illustrated in FIG. 12A.

When the processing moves to step S1203, the detection part 423 of the device 120 notifies the information processing device 10 through the wireless communication part 421 that a predetermined event (e.g., a trial and error operation of the device 120) has been detected. In addition, when the amount of communication data increases in the communication processing used for the function of the device 120 (e.g., communication processing for image formation such as reception of print data or transmission of scan data), the frequency band for the communication processing used for the function of the device may be changed from the originally used frequency band, so that the communication processing used for the function of the device 120 is executed using a high frequency band, and the wireless sensing is executed using a low frequency band. In addition, when the amount of communication data in the communication processing used for the functions of the device 120 lowers again, the frequency band used may be changed to the originally used frequency band.

(Processing of Information Processing Device)

Figure 12B:
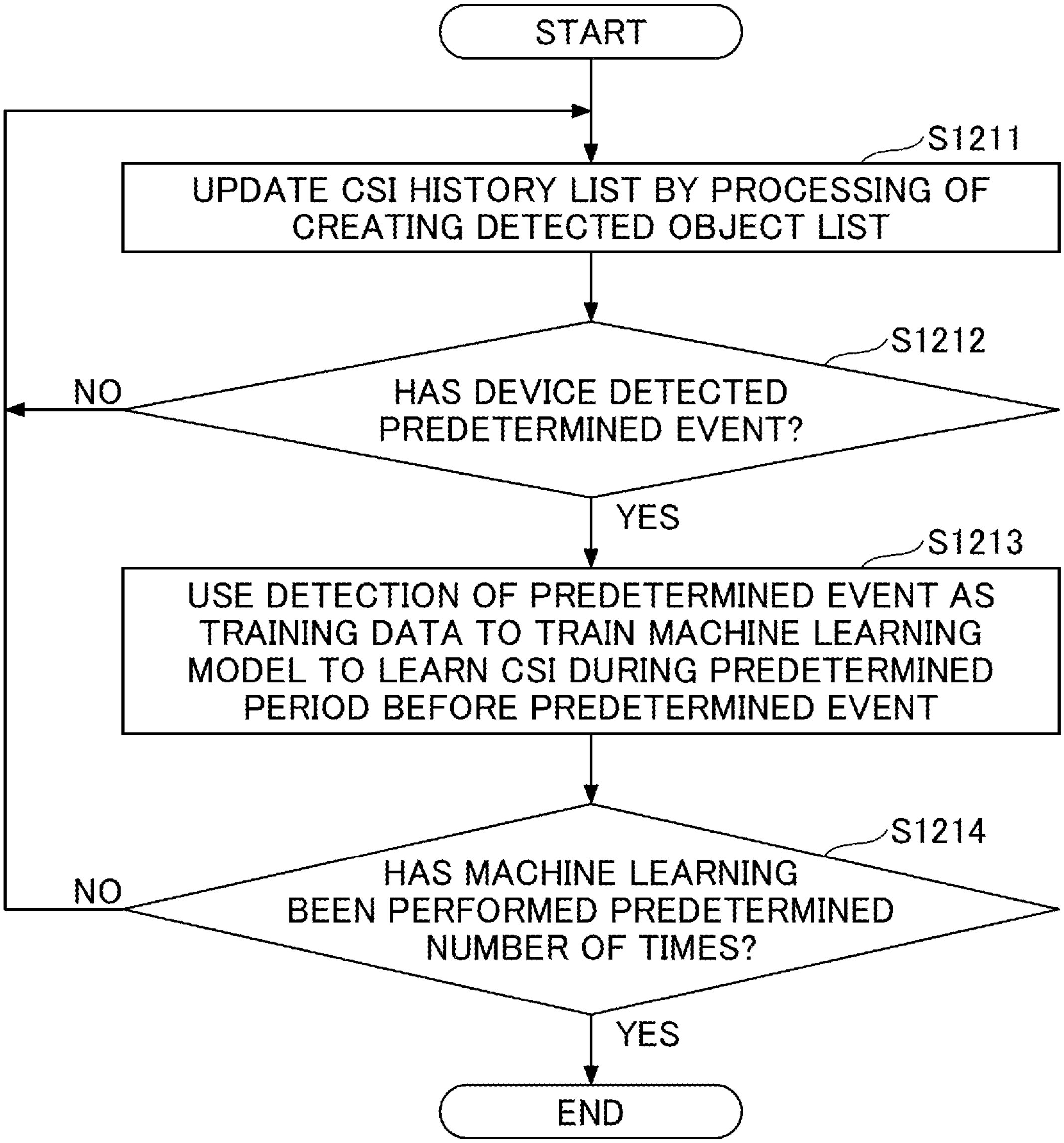

FIG. 12B is a flowchart illustrating an example of processing of an information processing device during machine learning. This processing illustrates an example of processing of the information processing device 10 with respect to the processing of the device 120 described in FIG. 12A.

In step S1211, the information management part 405 of the information processing device 10 executes processing of creating the detected object list described in FIG. 9B to update the CSI history list 602.

In step S1212, the machine learning part 403 of the information processing device 10 determines whether the device 120 has detected a predetermined event (e.g., a trial and error operation of the device 120). For example, the information management part 405 determines whether a notification indicating that the predetermined event has been detected has been received from the device 120. When the device 120 detects the predetermined event, the machine learning part 403 moves the processing to step S1213. On the other hand, when the device 120 does not detect the predetermined event, the machine learning part 403 returns the processing to step S1211.

When the processing moves to step S1213, the machine learning part 403 uses the detection of a predetermined event by the device 120 as training data to train the machine learning model 407 to learn CSI during a predetermined period before the predetermined event. For example, the machine learning part 403 acquires, from the CSI history list 602, CSI during a predetermined period immediately before the time at which the device 120 has detected the predetermined event, and trains the machine learning model 407 by machine learning using training data in which the time at which the predetermined event has occurred or the like is added to the acquired CSI.

In step S1214, the machine learning part 403 determines whether the machine learning has been performed a predetermined number of times. When the machine learning has not been performed the predetermined number of times, the machine learning part 403 returns the processing to step S1211. On the other hand, when the machine learning has been performed the predetermined number of times, the machine learning part 403 terminates the processing illustrated in FIG. 12B.

By the processing of FIG. 12B, the information processing device 10 can obtain a trained machine learning model 407.

<Post-Machine Learning Processing>

Figure 13A:
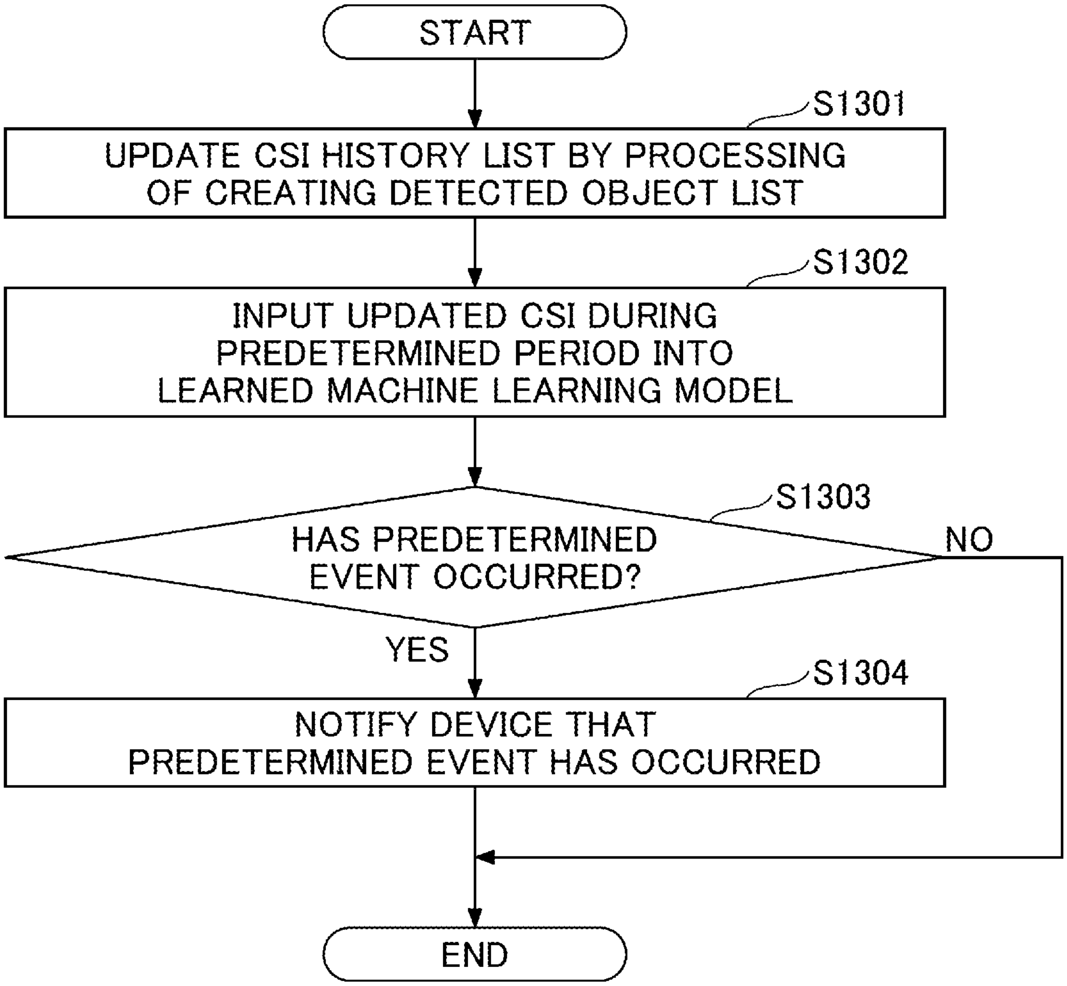
FIGS. 13A and 13B are flowcharts each illustrating an example of post-machine learning processing according to the first embodiment.

FIG. 13A is a flowchart illustrating an example of post-machine learning processing of the information processing device. It is assumed that at the start of the processing in FIG. 13A, the information processing device 10 stores, in the storage part 406, etc., the machine learning model 407 trained by the processing in FIGS. 12A and 12B.

In step S1301, the information management part 405 of the information processing device 10 executes processing of creating the detected object list described in FIG. 9B to update the CSI history list 602.

In step S1302, the machine learning part 403 of the information processing device 10 inputs updated CSI during a predetermined period into the trained machine learning model 407. Accordingly, the trained machine learning model 407 outputs a determination (classification) result indicating whether the predetermined event has occurred.

In step S1303, the notification part 404 of the information processing device 10 branches the processing according to whether the predetermined event has occurred. When the predetermined event has occurred, the notification part 404 notifies the device 120 via the communication part 401 that the predetermined event has occurred at the device 120 (step S1304). When the predetermined event has not occurred, the notification part 404 terminates the processing without notification.

The information processing device 10 can detect that the predetermined event has occurred at the device 120 by repeatedly executing the processing illustrated in FIG. 13A.

(Processing of a Device)

Figure 13B:
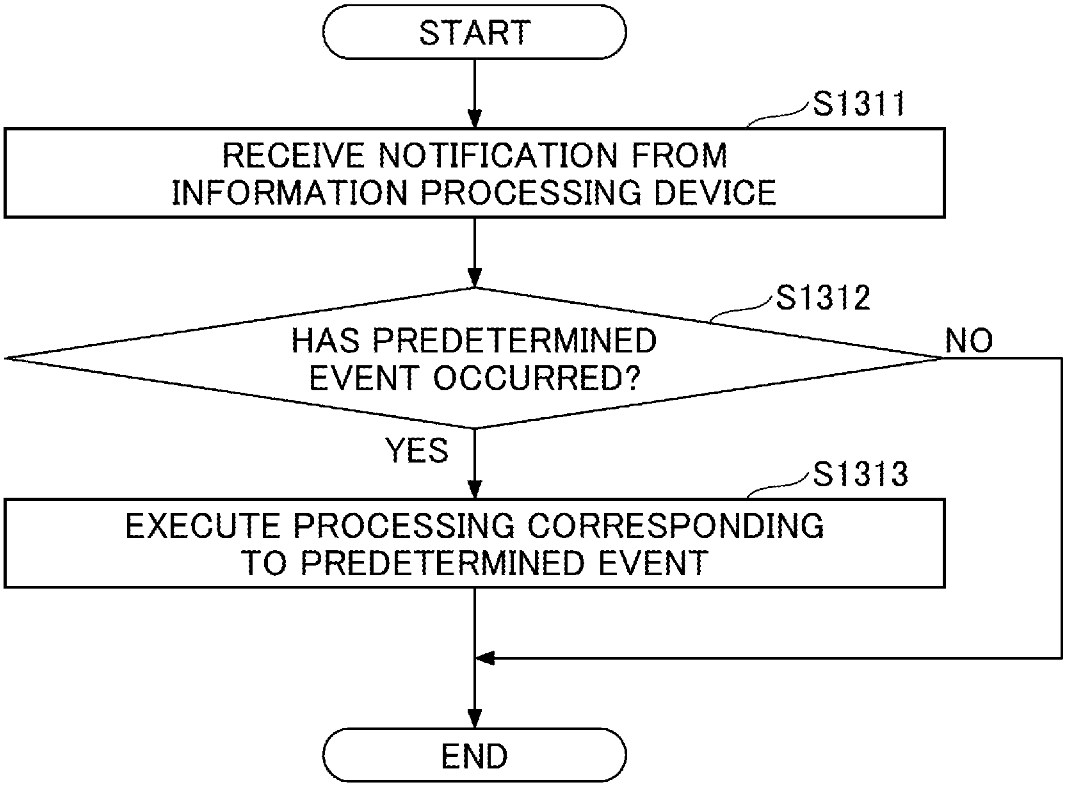

FIG. 13B is a flowchart illustrating an example of post-machine learning processing of the device. This processing illustrates an example of processing of the device 120 with respect to the processing of the information processing device described in FIG. 13A.

In step S1311, upon receiving the notification from the information processing device 10, the device 120 executes processing in step S1312 onward.

In step S1312, the device control part 422 of the device 120 determines whether a predetermined event has occurred. For example, when the notification received from the information processing device 10 is notification indicating that the predetermined event has occurred, the device control part 422 determines that the predetermined event has occurred. When the predetermined event has occurred, the device control part 422 moves the processing to step S1313. On the other hand, when the predetermined event has not occurred, the device control part 422 terminates the processing illustrated in FIG. 13B.

Moving to step S1313, the device control part 422 executes the processing corresponding to the predetermined event. For example, when the predetermined event is an action of a person 20 who is confused about the operation of the device 120, the device control part 422 displays a display element for leading to an operation manual on the operation panel 316.

Thus, according to the first embodiment, it becomes easy to train the machine learning model so that an action of the person 20 who operates the device 120 can be sensed based on a radio wave state pattern.

Second Embodiment

In a second embodiment, an example of processing when the wireless device 110 and the device 120 support multiple frequency bands, such as the 60 GHz band, 5 GHz band, and 2.4 GHz band, will be described.

For example, when it is desired to wirelessly sense an action of the person 20 with higher accuracy, it is desirable to perform wireless sensing in a higher frequency band, such as the 60 GHz band. For example, when it is desired to detect an action of the person 20 who is confused about the operation of the device 120, it is possible to use a radio wave state pattern relating to the operation with confusion in which the finger moves back and forth in front of the operation panel 316 or the operation with consideration in which the finger stops for a long time in front of the operation panel 316 by using CSI in the 60 GHz band.

On the other hand, if attempting to sense the movement of the finger in the 2.4 GHz band, there is concern of the radio wave state pattern becoming noise and instead inhibiting machine learning. However, it is not desirable to perform all the radio sensing with only CSI in the 60 Hz band in view of the efficient use of radio communication.

Therefore, in the second embodiment, the device 120 notifies the information processing device 10 of a frequency band to be used for radio sensing according to a predetermined event to be detected.

<Machine Learning Processing>

(Processing of a Device)

Figure 14A:
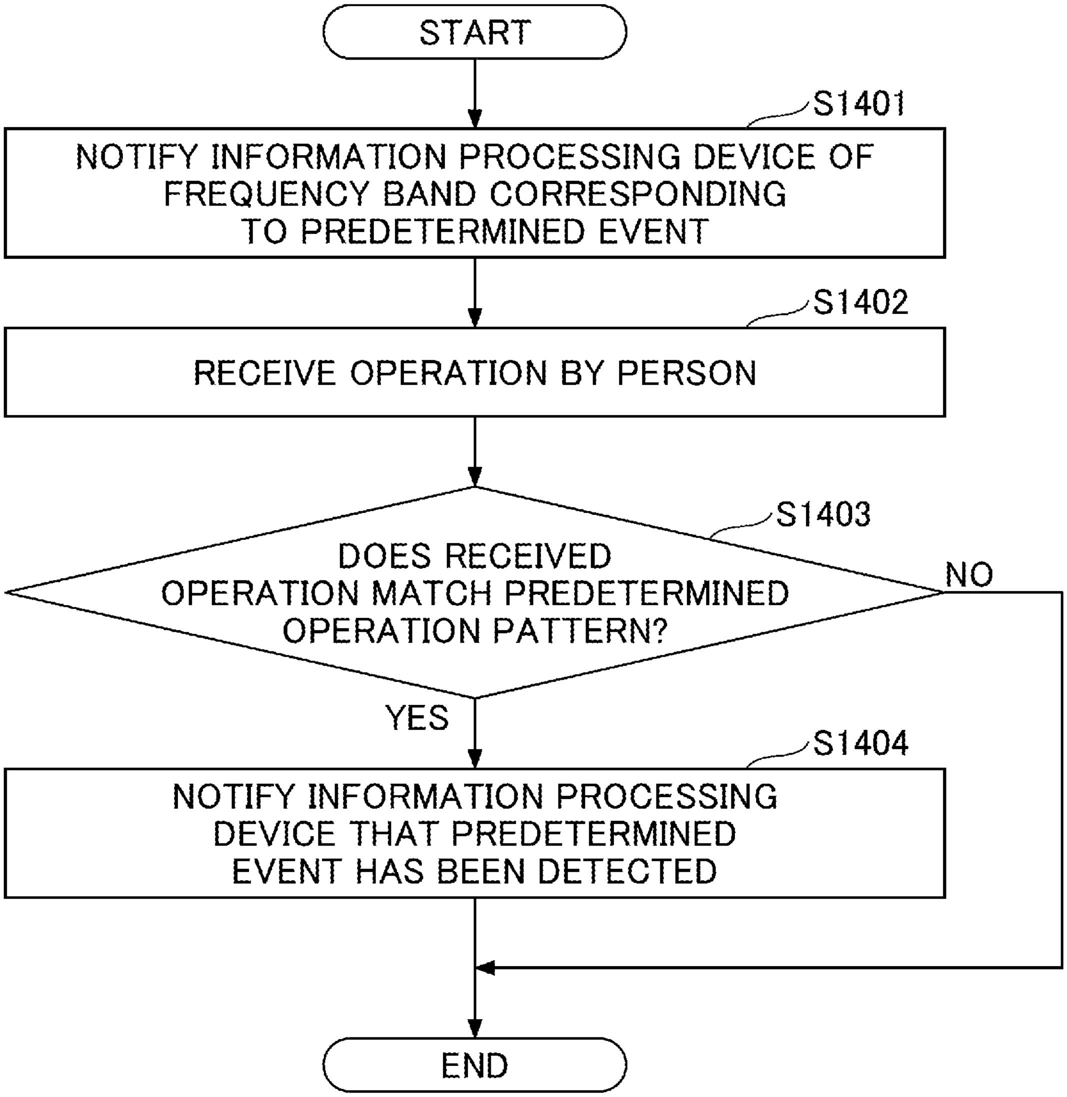
FIGS. 14A and 14B are flowcharts each illustrating an example of machine learning processing according to a second embodiment.

FIG. 14A is a flowchart illustrating an example of processing of a device during machine learning. Of the processing illustrated in FIG. 14A, the processing of steps S1402 to S1404 is similar to the processing of steps S1201 to S1203 in the device during machine learning according to the first embodiment described in FIG. 12A, and the description is thus omitted here.

In step S1401, the detection part 423 of the device 120 notifies the information processing device 10 of a frequency band corresponding to a predetermined event to be detected. For example, the device 120 stores corresponding information 1500 illustrated in FIG. 15 in advance in the storage device 313 or the like.

FIG. 15 is a diagram illustrating an example of correspondence information according to the second embodiment. In the example of FIG. 15, corresponding information 1500 includes, as items, information such as "predetermined event", "frequency band to be used", and "corresponding processing". The "predetermined event" is information indicating an event to be detected. The "frequency band to be used" is information indicating a frequency band to be used when detecting a "predetermined event". The "corresponding processing" is information indicating processing to be performed when detecting a "predetermined event".

As illustrated in the example of FIG. 15, when a predetermined event is "user's trial and error", CSI in the 60 GHz band is used, and when "user's trial and error" is detected, the device 120 performs "leading to the operation manual". As also illustrated in the example of FIG. 15, when a predetermined event is "user's approach", a radar reflection value or CSI in the 5 GHz band is used, and when "user's approach" is detected, "cancelling the power saving mode" is performed.

Based on the corresponding information 1500, the detection part 423 identifies a frequency band corresponding to a predetermined event to be detected, and notifies the information processing device 10 of the identified frequency band.

(Processing of the Information Processing Device)

Figure 14B:
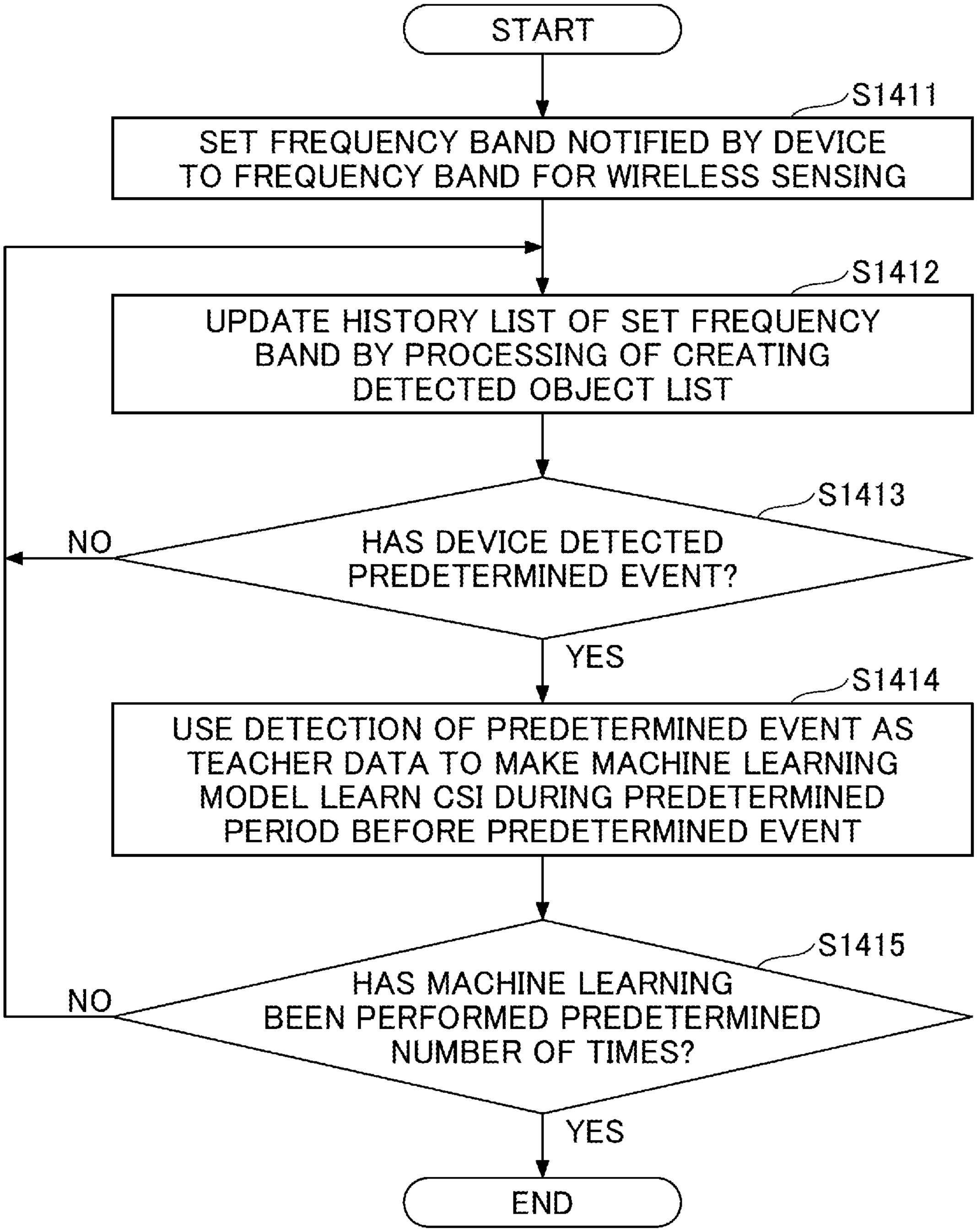

FIG. 14B is a flowchart illustrating an example of processing of the information processing device during machine learning. This processing illustrates an example of processing of the information processing device 10 with respect to the processing of the device 120 described in FIG. 14A. Since the basic processing content is the same as that of the information processing device during machine learning in the first embodiment described in FIG. 12B, a detailed description of processing similar to that in the first embodiment is omitted here.

In step S1411, the information management part 405 of the information processing device 10 sets part or all of the frequency band notified by the device 120 to the frequency band for wireless sensing.

In step S1412, the information management part 405 executes processing of creating a detected object list in the frequency band for wireless sensing to update the history list (CSI history list 602 or radar reflection value history list 604) of the set frequency band. In the present embodiment, the expression A or B includes only A, only B, and a combination of A and B.

In step S1413, the machine learning part 403 of the information processing device 10 determines whether the device 120 has detected a predetermined event. When the device 120 has detected the predetermined event, the machine learning part 403 moves the processing to step S1414. On the other hand, when the device 120 has not detected the predetermined event, the machine learning part 403 returns the processing to step S1412.

When the processing moves to step S1414, the machine learning part 403 uses the detection of the predetermined event by the device 120 as training data to train the machine learning model 407 to learn a state of radio waves (CSI or radar reflection value) during a predetermined period before the predetermined event.

In step S1415, the machine learning part 403 determines whether machine learning has been performed a predetermined number of times. When machine learning has not been performed for the predetermined number of times, the machine learning part 403 returns the processing to step S1412. On the other hand, when machine learning has been performed for the predetermined number of times, the machine learning part 403 terminates the processing illustrated in FIG. 14B.

By the processing illustrated in FIG. 14A and FIG. 14B, the information processing system 1 can train the machine learning model 407 by using the set frequency band according to the predetermined action to be detected.

<Post-Machine Learning Processing>

(Processing of Information Processing Device)

Figure 16A:
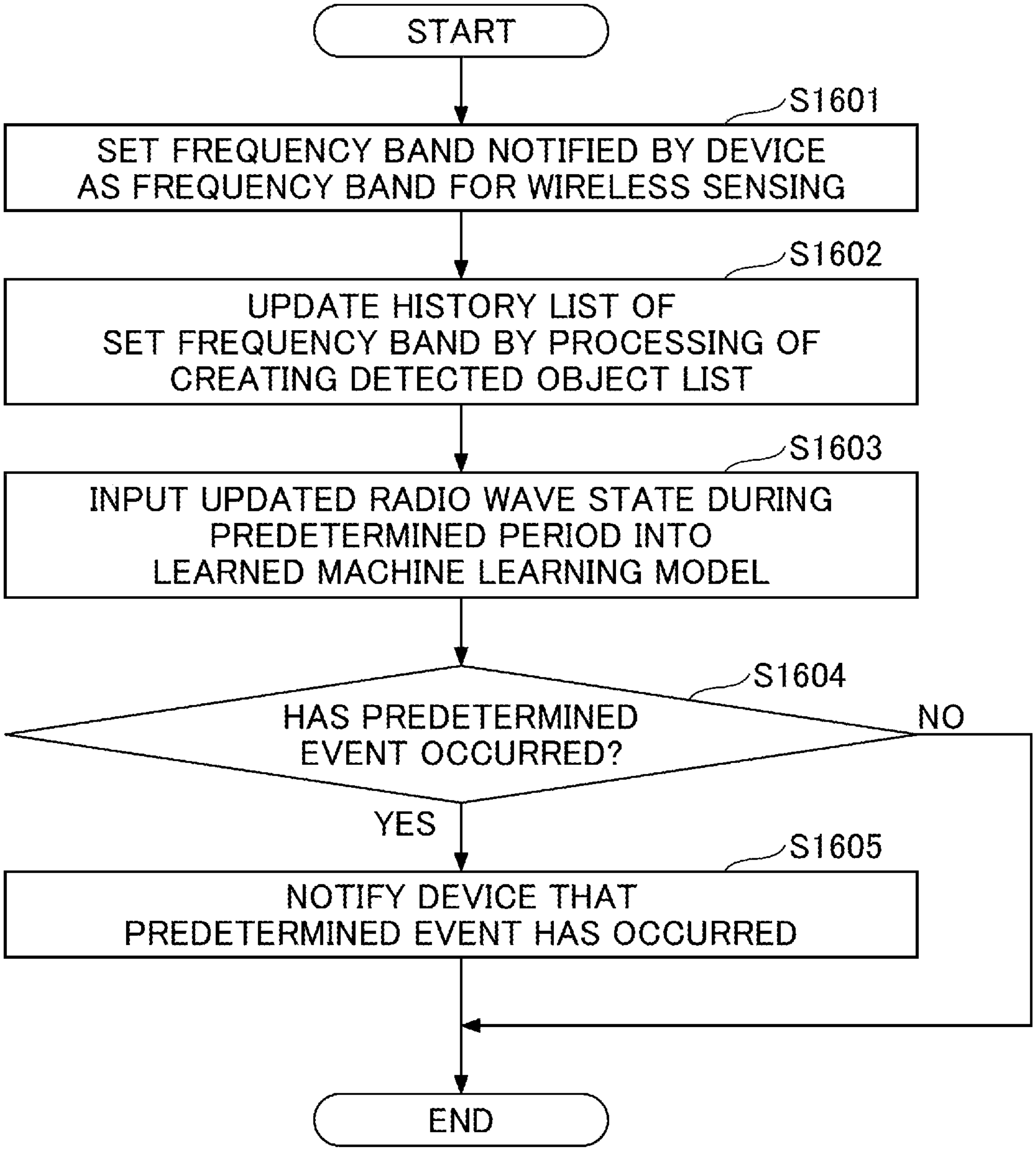
FIGS. 16A and 16B are flowcharts each illustrating an example of post-machine learning processing according to the second embodiment.

FIG. 16A is a flowchart illustrating an example of post-machine learning processing of the information processing device. It is assumed that at the start of the processing in FIG. 16A, the information processing device 10 stores the machine learning model 407 trained by the processing in FIGS. 14A and 14B, etc., in the storage part 406. Also, of the processing illustrated in FIG. 16A, the processing of steps S1604 and S1605 is similar to the post-machine learning processing of steps S1303 and S1304 in the information processing device according to the first embodiment described in FIG. 13A, and the description is thus omitted here.

In step S1601, the information management part 405 of the information processing device 10 sets a frequency band notified by the device 120 as a frequency band for wireless sensing.

In step S1602, the information management part 405 executes processing of creating a detected object list in the frequency band for wireless sensing and updates the history list (CSI history list 602 or radar reflection value history list 604) of the set frequency band.

In step S1603, the machine learning part 403 of the information processing device 10 inputs an updated state of radio waves during a predetermined period (CSI or radar reflection value) into the trained machine learning model 407. Accordingly, the trained machine learning model 407 outputs a determination (classification) result indicating whether the predetermined event has occurred.

(Processing of a Device)

Figure 16B:
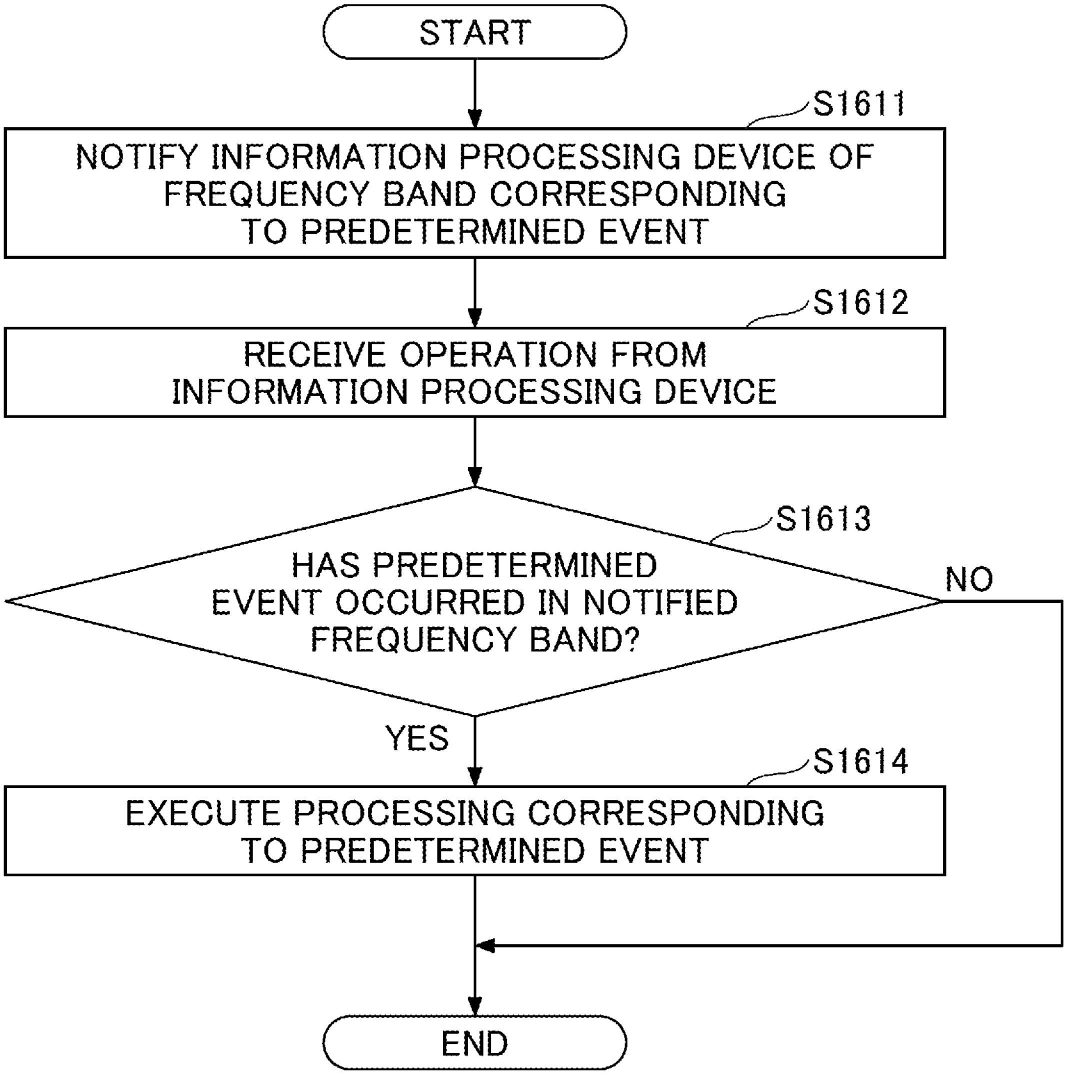

FIG. 16B is a flowchart illustrating an example of post-machine learning processing of a device. This processing illustrates an example of the processing of the device 120 with respect to the processing of the information processing device described in FIG. 16A.

In step S1611, the detection part 423 of the device 120 notifies the information processing device 10 of the frequency band corresponding to the predetermined event to be detected. Herein, the frequency band notified by the detection part 423 to the information processing device 10 is the same as the frequency band notified by the detection part 423 to the information processing device 10 in step S1401 of FIG. 14A.

In step S1612, upon receiving the notification from the information processing device 10, the device 120 executes processing after step S1613 onward.

In step S1613, the device control part 422 of the device 120 determines whether the predetermined event has occurred in the frequency band notified to the information processing device 10. For example, when the notification received from the information processing device 10 is a notification indicating that the predetermined event has occurred, the device control part 422 determines that the predetermined event has occurred in the notified frequency band. When the predetermined event has occurred in the notified frequency band, the device control part 422 moves the processing to step S1614. On the other hand, when the predetermined event has not occurred in the notified frequency band, the device control part 422 terminates the processing illustrated in FIG. 13B.

Moving to step S1614, the device control part 422 executes the processing corresponding to the predetermined event. For example, the device control part 422 acquires and executes the processing corresponding to the predetermined event by referring to the corresponding information 1500 described in FIG. 15.

Thus, according to the second embodiment, the frequency band used for wireless sensing by the device 120 can be set according to the predetermined event to be detected.

As described above, according to each of the embodiments of the present invention, the information processing system configured to use radio waves to sense an action of a person who operates a device facilitates detection of a predetermined action of a person who operates a device.

(Example of Usage Scene)

Each embodiment of the present invention can be applied, for example, to a case where a user operates an MFP (multifunction peripheral/product) installed in an unmanned convenience store, or an electronic device installed in an airport lounge, hotel, etc.

For example, the information processing system 1 can be configured to manage electronic devices installed in a hotel. Various electronic devices are installed in a hotel. For example, automatic check-in machines are often installed in the lobby. Also, guest rooms are often equipped with set-top boxes that can play television broadcasts and on-demand videos. Managing these electronic devices by the information processing system 1 enables detection of the predetermined actions of the people who operate the electronic devices.

For example, the information processing system 1 can be configured to manage the electronic devices installed in the airport. At the airport, passengers are required to pass through procedures such as ticketing, check-in and baggage inspection before boarding an aircraft, and the boarding pass is processed by a dedicated electronic device in each procedure. Managing these electronic devices by the information processing system lenables detection of the predetermined actions of the people who operate the electronic devices.

For example, the information processing system 1 can be configured to manage electronic devices such as search terminals installed in bookstores. Managing these electronic devices by the information processing system 1 enables detection of the predetermined actions of the people who operate the electronic devices. In addition to the above-mentioned hotels, airports and bookstores, the information processing system 1 can be similarly used in public facilities including stations and public spaces. For example, the information processing system 1 can be used to detect an operation of a user in trouble and to notify the terminal of an attendant to display a guide screen and provide assistance accordingly, or to detect an operation of a suspicious person and start monitoring to issue an alarm or notify the terminal of a security guard to ensure safety.

For example, the information processing system 1 can be configured to manage electronic devices such as PCs installed in a factory. Managing these electronic devices by the information processing system 1 enables detection of the predetermined actions of the people who operate the electronic devices.

In addition, for example, the information processing system 1 can be configured to manage electronic devices installed in unmanned stores of convenience stores. Electronic devices such as MFPs and self-checkout machines are installed in convenience stores. Managing these electronic devices by the information processing system 1 enables detection of the predetermined actions of the people who operate the electronic devices. In addition, the information processing system 1 can be similarly used in the operation of the electronic devices in a situation where the electronic devices are installed in an unmanned place or a place with few people, in addition to the factories and convenience stores mentioned above. For example, the information processing system 1 can be used to detect an action of a user in trouble and to notify to the terminal of a person in charge to display a guide or explain the operation method in response.

For example, the information processing system 1 can be configured to manage multiple home appliances (electronic devices) at home. Managing these electronic devices by the information processing system 1 enables detection of the predetermined actions of the people who operate the electronic devices. In addition, managing these electronic devices by the information processing system 1 enables detection of an action of a person who needs to be watched, such as a child or an elderly person, in the home or indoors, processing to start and stop monitoring recording accordingly, and processing to start and stop sending messages and recording data to the terminal of the family through the information processing system 1. In this case, the system may include a television, a refrigerator, etc., and a photographing unit (camera) as one or more home appliances (electronic devices).

<Supplementary Description>

Each function of each of the above described embodiments can be implemented by one or more processing circuits. Herein, a "processing circuit" in this specification is defined to include a processor programmed by software to perform each function, such as a processor implemented by an electronic circuit, and devices such as ASICs (Application Specific Integrated Circuits), DSPs (Digital Signal Processors), FPGAs (Field Programmable Gate Arrays) and related art circuit modules configured to perform each function described above.

In addition, a set of the devices described in the examples only represents one of the multiple computing environments for implementing the embodiments disclosed herein. In one embodiment, the information processing device 10 includes multiple computing devices, such as a server cluster. The multiple computing devices are configured to communicate with each other over any type of communication link, including a network, shared memory, etc., and perform the processing disclosed herein. Similarly, the wireless device 110 can include multiple computing devices configured to communicate with each other.

In addition, the information processing device 10, the wireless device 110, and the device 120 can be configured to share the disclosed processing steps in various combinations. For example, a process performed by a predetermined unit can be performed by the information processing device 10, the wireless device 110, or the device 120. Further, respective components of the information processing device 10 may be integrated into one device or separately disposed in multiple devices.

As described above, the present invention is not limited to each of the specific embodiments, and various modifications and applications are possible within the scope of the invention described in the claims.

According to one embodiment of the present invention, wireless sensing enables the detection of a predetermined action of a user who operates a device.

What is claimed is:

1. An information processing system comprising:

an information processing device configured to use radio waves to sense an action of a user who manually operates a device, the information processing device including a communication part communicably connected to the device via a network, the information processing device further including:

one or more processors; and a memory storing a computer-readable program having instructions, which when executed by the one or more processors, cause the one or more processors to execute a process, the process including:

acquiring a state of radio waves in an area where the device is installed;

receiving, from the device via the communication part, sensing band information indicating a frequency band specified by the device among a plurality of frequency bands set in advance to be selectively used for wireless sensing of predetermined events in the device, each of the plurality of frequency bands stored in association with one of the predetermined events;

setting the specified frequency band indicated in the sensing band information, as a frequency band used for the wireless sensing;

receiving notification information from the device via the communication part, the notification information indicating that one of the predetermined events has been detected in the device;

determining whether the one of the predetermined events has occurred based on a first state of radio waves and a second state of radio waves, the first state of radio waves acquired by using the specified frequency band indicated in the sensing band information after receiving the notification information, the second state of radio waves acquired during a predetermined period before receiving the notification information; and in response to determining that the one of the predetermined events has occurred, notifying the device that the one of the predetermined events is determined.

2. The information processing system according to claim 1, wherein the process further includes:

storing a machine learning model, the machine learning model being trained by machine learning with the detection of the one of the predetermined events by the device and the second state of radio waves during the predetermined period before the one of the predetermined events, as training data; and determining whether the one of the predetermined events has occurred at the device, based on the first state of radio waves and the machine learning model.

3. The information processing system according to claim 2, wherein the process further includes:

training the machine learning model to learn the second state of radio waves during the predetermined period by using the detection of the one of the predetermined events by the device as training data.

4. The information processing system according to claim 2, wherein the process further includes:

in response to determining that the one of the predetermined events has occurred at the device by the machine learning model, notifying the device that the one of the predetermined events has occurred.

5. The information processing system according to claim 4, wherein in response to receiving the notification that the one of the predetermined events has occurred, the device performs processing corresponding to the one of the predetermined events.

6. The information processing system according to claim 2, wherein the process further includes:

performing radio communication with one or more devices, wherein the first state or the second state of radio waves includes channel state information acquired by the radio communication.

7. The information processing system according to claim 6, wherein the process further includes:

inputting the channel state information acquired by the radio communication in the frequency band into the stored machine learning model to determine that the user has performed a predetermined action.

8. The information processing system according to claim 2, wherein the first state or the second state of radio waves includes channel state information, and the process further includes:

associating the action of the user to be detected with an operation of the device; and train the machine learning model using the channel state information, before the operation of the device is performed, as truth data.

9. The information processing system according to claim 1, wherein the process further includes determining that the one of the predetermined events has occurred at the device in response to detecting a predetermined number of times of the change.

10. The information processing system according to claim 1, wherein the device operated by the user is an image forming device, and the predetermined events include opening or closing a paper feed tray in the image forming device.

11. The information processing system according to claim 1, wherein the predetermined events include trial and error in operating the device by the user, and the device displays a display element for leading to an operation manual of the device on an operation panel of the device in response to receiving a notification that the trial and error by the user has occurred.

12. The information processing system according to claim 1, wherein the first state or the second state of radio waves includes channel state information, and the process further includes setting a most frequent channel state information identified for each sensing direction as a reference state used for sensing the action of the user.

13. The information processing system according to claim 12, wherein the process further includes setting the most frequent channel state information at a predetermined setting time as the reference state.

14. The information processing system according to claim 1, wherein the device includes an operation panel, the device transmits, to the information processing device, the notification information indicating that the one of the predetermined events has been detected as an misoperation, in response to the action of the user that is an operation to return to a previous screen on the operation panel or an operation to display a predetermined screen a predetermined number of times after receiving an initial manual operation of the operation panel by the user, and the information processing device determines that the one of the predetermined events has occurred as the misoperation based on the first state of radio waves and the second state of radio waves, and notifies the device that the one of the predetermined events is determined.

15. The information processing system according to claim 1, wherein the one of the predetermined events is a state of the action of the user with respect to an irrelevant motion without performing a manual operation of the device or an incorrect manual operation of the device after receiving an initial manual operation of the device by the user.

16. The information processing system according to claim 1, wherein the plurality of frequency bands include a first frequency band and a second frequency band lower than the first frequency band, and the process further includes setting the first frequency band as the frequency band for the wireless sensing in a case in which the one of the predetermined events is a trial-and-error action of the user, and setting the second frequency band as the frequency band for the wireless sensing in a case in which the one of the predetermined events is an approach action of the user toward the device.

17. The information processing system according to claim 1, further comprising the device, the device including:

one or more processors; and a memory storing a computer-readable program having instructions, which when executed by the one or more processors, cause the one or more processors to execute a device-side process, the device-side process including:

storing the plurality of frequency bands in association with the predetermined events;

detecting the one of the predetermined events;

specifying the frequency band to be used for the wireless sensing, the specified frequency band corresponding to the detected one of the predetermined events; and transmitting the sensing band information indicating the specified frequency band to the information processing device before the wireless sensing is executed by the information processing device.

18. An information processing device configured to use radio waves to sense an action of a user who manually operates a device connected to the information processing device via a network, the information processing device comprising:

a communication part communicably connected to the device;

one or more processors; and a memory storing a computer-readable program having instructions, which when executed by the one or more processors, cause the one or more processors to execute a process, the process including:

acquiring a state of radio waves in an area where the device is installed;

receiving, from the device via the communication part, sensing band information indicating a frequency band specified by the device among a plurality of frequency bands set in advance to be selectively used for wireless sensing of predetermined events in the device, each of the plurality of frequency bands stored in association with one of the predetermined events;

setting the specified frequency band indicated in the sensing band information, as a frequency band used for the wireless sensing;

receiving notification information from the device via the communication part, the notification information indicating that one of the predetermined events has been detected in the device;

determining whether the one of the predetermined events has occurred based on a first state of radio waves and a second state of radio waves, the first state of radio waves acquired by using the specified frequency band indicated in the sensing band information after receiving the notification information, the second state of radio waves acquired during a predetermined period before receiving the notification information; and in response to determining that the one of the predetermined events has occurred, notifying the device that the one of the predetermined events is determined.

19. An information processing method used in an information processing system, the information processing system including an information processing device configured to use radio waves to sense an action of a user who manually operates a device connected to the information processing device via a network, one or more processors, and a memory storing a computer-readable program having instructions, which when executed by the one or more processors, cause the one or more processors to execute the information processing method, the information processing method comprising:

acquiring a state of radio waves in an area where the device is installed;

receiving, from the device via a communication part of the information processing device, sensing band information indicating a frequency band specified by the device among a plurality of frequency bands set in advance to be selectively used for wireless sensing of predetermined events in the device, each of the plurality of frequency bands stored in association with one of the predetermined events;

setting the specified frequency band indicated in the sensing band information, as a frequency band used for the wireless sensing;

receiving notification information from the device via the communication part of the information processing device, the notification information indicating that one of the predetermined events has been detected in the device;

determining whether the one of the predetermined events has occurred based on a first state of radio waves and a second state of radio waves, the first state of radio waves acquired by using the specified frequency band indicated in the sensing band information after receiving the notification information, the second state of radio waves acquired during a predetermined period before receiving the notification information; and in response to determining that the one of the predetermined events has occurred, notifying the device that occurrence of the one of the predetermined events in the device is determined.

20. A non-transitory computer-readable recording medium storing a program having instructions, which when executed by one or more processors of a computer in an information processing system, causes the computer to perform the information processing method according to claim 19.

* * * * *